United States Patent
Shah

(10) Patent No.: US 7,125,945 B2
(45) Date of Patent: Oct. 24, 2006

(54) FUNCTIONALIZED POLYMER FOR OLIGONUCLEOTIDE PURIFICATION

(75) Inventor: Vipul J. Shah, West Covina, CA (US)

(73) Assignee: Varian, Inc., Palo Alto, CA (US)

( * ) Notice: Subject to any disclaimer, the term of this patent is extended or adjusted under 35 U.S.C. 154(b) by 322 days.

(21) Appl. No.: 10/664,617

(22) Filed: Sep. 19, 2003

(65) Prior Publication Data
US 2005/0065290 A1 Mar. 24, 2005

(51) Int. Cl.
C08F 12/08 (2006.01)
B01D 15/08 (2006.01)

(52) U.S. Cl. ............. 526/346; 526/242; 526/296; 210/635; 210/634; 210/679; 435/803

(58) Field of Classification Search ........ 526/346, 526/242, 296; 210/635, 634, 679; 435/803; 428/323, 327
See application file for complete search history.

(56) References Cited

U.S. PATENT DOCUMENTS

| | | | |
|---|---|---|---|
| 4,352,909 A | 10/1982 | Barda et al. | |
| 4,469,863 A | 9/1984 | Ts'o et al. | |
| 4,725,677 A | 2/1988 | Koster et al. | |
| 4,774,339 A | 9/1988 | Haugland et al. | |
| 5,034,506 A | 7/1991 | Summerton et al. | |
| 5,124,047 A | 6/1992 | Quach et al. | |
| 5,138,045 A | 8/1992 | Cook et al. | |
| RE34,069 E | 9/1992 | Koster et al. | |
| 5,187,288 A | 2/1993 | Kang et al. | |
| 5,214,134 A | 5/1993 | Weis et al. | |
| 5,216,141 A | 6/1993 | Benner | |
| 5,218,105 A | 6/1993 | Cook et al. | |
| 5,223,618 A | 6/1993 | Cook et al. | |
| 5,248,782 A | 9/1993 | Haugland et al. | |
| 5,264,562 A | 11/1993 | Matteucci | |
| 5,274,113 A | 12/1993 | Kang et al. | |
| 5,278,302 A | 1/1994 | Caruthers et al. | |
| 5,321,131 A | 6/1994 | Agrawal et al. | |
| 5,359,044 A | 10/1994 | Cook et al. | |
| 5,378,825 A | 1/1995 | Cook et al. | |
| 5,386,023 A | 1/1995 | Sanghvi et al. | |
| 5,433,896 A | 7/1995 | Kang et al. | |
| 5,434,257 A | 7/1995 | Matteucci et al. | |
| 5,451,463 A | 9/1995 | Kang et al. | |
| 5,455,233 A | 10/1995 | Spielvogel et al. | |
| 5,457,191 A | 10/1995 | Cook et al. | |
| 5,459,255 A | 10/1995 | Cook et al. | |
| 5,466,677 A | 11/1995 | Baxter et al. | |
| 5,470,967 A | 11/1995 | Huie et al. | |
| 5,489,677 A | 2/1996 | Sanghvi et al. | |
| 5,506,351 A | 4/1996 | McGee | |
| 5,519,126 A | 5/1996 | Hecht | |
| 5,541,307 A | 7/1996 | Cook et al. | |
| 5,543,507 A | 8/1996 | Cook et al. | |
| 5,571,902 A | 11/1996 | Ravikumar et al. | |
| 5,578,718 A | 11/1996 | Cook et al. | |
| 5,585,236 A | 12/1996 | Bonn et al. | |
| 5,587,361 A | 12/1996 | Cook et al. | |
| 5,587,469 A | 12/1996 | Cook et al. | |
| 5,587,470 A | 12/1996 | Cook et al. | |
| 5,596,086 A | 1/1997 | Matteucci et al. | |
| 5,602,240 A | 2/1997 | De Mesmaeker et al. | |
| 5,610,289 A | 3/1997 | Cook et al. | |
| 5,614,617 A | 3/1997 | Cook et al. | |
| 5,670,633 A | 9/1997 | Cook et al. | |
| 5,792,608 A | 8/1998 | Swaminathan et al. | |
| 5,817,781 A | 10/1998 | Swaminathan et al. | |
| 5,882,551 A | 3/1999 | Dever et al. | |
| 6,156,896 A | 12/2000 | Curran et al. | |
| 6,288,157 B1 | 9/2001 | Jariwala et al. | |
| 6,320,040 B1 | 11/2001 | Cook et al. | |
| 6,355,791 B1 * | 3/2002 | Gjerde et al. ............. 536/25.4 |
| 6,447,749 B1 | 9/2002 | Licha et al. | |
| 6,518,368 B1 | 2/2003 | Gill et al. | |
| 6,521,714 B1 | 2/2003 | Kolich et al. | |
| 6,525,127 B1 | 2/2003 | Jariwala et al. | |
| 2003/0055241 A1 | 3/2003 | Moore et al. | |

FOREIGN PATENT DOCUMENTS

| | | |
|---|---|---|
| WO | WO 86/05518 | 9/1986 |
| WO | WO 90/15065 | 12/1990 |
| WO | WO 91/18997 | 12/1991 |
| WO | WO 92/05186 | 4/1992 |

OTHER PUBLICATIONS

Abstract by Haung, GJ and Krugh, TR, entitled "Large Scale Purification of Synthetic Oligonucleotides and Carcinogen-modified oligodeoxynucleotides on a reverse-phase polystyrene (PRP-1) column", download from www.ncbi.nlm.nih.gov, Sep. 9, 2003.

Article by Bosch, JT, et al., entitled "Validation of Sequence-Optimized 70 Base Oligonucleotides for Use on DNA Microarrays", pulished Sep. 2003, OPERON, A Qiagen Company.

Article by Kane, MD, et al., entitled "Assessment of the Sensitivity and Specificty of Oligonucleotide (50mer) Microarrays", published in Nucleic Acids Research, 2000, vol. 28, No. 22, pp. 4552-4557.

Article by Huber, CG, et al., entitled "High-Resolution Liquid Chromatography of Oligonucleotides on Nonporous Alkylated Styrene-Divinylbenzene Copolymers", published by Analytical Biochemistry, 212, pp. 351-358 (1993).

(Continued)

*Primary Examiner*—Ling-Sui Choi
(74) *Attorney, Agent, or Firm*—Cynthia Moore; Bella Fishman

(57) ABSTRACT

Halogenated polymers of vinyl aromatic monomers comprising styrene and divinylbenzene are provided for use in a chromatographic separation method of analytes, wherein said polymer further comprises a hydrocarbyl or halocarbyl substituent comprising from 1 to 1,000,000 carbon atoms, or combinations thereof. Methods of using the halogenated polymers are also provided. The polymers and methods are particularly useful in the separation of nucleic acids labeled with hydrophobic labels such as protecting groups, fluorophores, and the like.

54 Claims, 9 Drawing Sheets

OTHER PUBLICATIONS

Article by Tallarico, JA., et al. entitled "An Alkylsilyl-Tethered, High-Capacity Solid Support Amenable to Divseristy-Oriented Synthesis for One-Bead,m One-Stock Solution Chemical Genetics", published by Journal of Combinatorial Chemistry, 2001, vol. 3, No. 3, pp. 312-318.

Article by Tan, DS., et al., entitled Stereoselective Synthesis of over Two Million Compounds Having Structural Features Both Reminiscent of Natural Products and Compatible with Miniaturized Cell-Based Assays, published in J. Am. Chem. Soc, 1998, 120, pp. 8565-8566.

Abstract by Stirchak, EP entitled Uncharged stereoregular nucleic acid analogs: 2. Morpholion nucleoside oligomers with carbamate internucleoside linkages, published in Nucleic Acids Res. 1989, Aug. 11;17(15):6129-41.

Article by Beaucage, SL and Iyer, RP, entitled The Synthesis of Specific Ribonucleotides and Unrelated Phosphorylated Biomolecules by the Phosphoramidite Method, published in Tetrahedron, vol. 49, No. 46, pp. 10441-10488, 1993.

Article by Mertes, MP and Coats, EA entitled "Synthesis of Carbonate Analogs Dinucleosides", published J. Med. Chem., 1969, vol. 12, pp. 154-157.

Article by Vasseur, et al., entitled "Oligonucleosides: Synthesis of a Novel Methylhydroxylamine-Linked Nucleoside Dimer and Its Incorporation into Antisense Sequences" published by J. Am. Chem. Soc, 1992, 114, pp. 4006-4007.

Article by Sood, A, et al., entitled "Boron-Containing Nucleic Acids" published by J. Am. Chem. Soc., 1990, 112, pp. 9000-9001.

Article by Musicki B and Widlanski TS entitled "Synthesis of Carbohydrate Sulfonates and Sulfonate Exters" published by J. Org. Chem., vol. 55, No. 14, 1990, pp. 4231-4233.

Article by Stirchak, EP and Summerton, JE entitled "Uncharged Stereoregular Nucleic Acid Analogues" published J. Org. Chem., 1987, 52, pp. 4202-4206.

Article by Reynolds, RC et al., entitled "Synthesis of Thymidine Dimers Containing Internucleoside Sulfonate and Sulfonamide Linkages" published by J. Org. Chem., 1992, 57, pp. 2983-2985.

Article by Samukov, VV et al., entitled 2-(4-Nitrophenyl)sulfonylethoxycarbonyl (Nsc) Group as a Base-Labile a-Amino Protection for Solid Phase Peptide Synthesis, published by Tetrahedron Letters, vol. 35, No. 42, pp. 7821-7824, 1994.

Article by Wang H. and Weller DD entitled "Solid Phase Synthesis of Neutral Oligonucleotide Analogues" published by Tetrahedron Letters, vol. 32, No. 50, pp. 7385-7388, 1991.

Article by Mungall, WS and Kaiser, JK entitled "Carbamate Analogues of Oligonucleotides" published by J. Org.Chem., vol. 42, No. 4, 1977, pp. 703-706.

Article by Coull, JM et al., entitled "Synthesis and Characterization of a Carbamate-Linked Oligonucleosides" published by Tetrahedron Letters, vol. 28, No. 7, pp. 745-748, 1987.

Article by Beaucage, SL and Iyer, RP, entitled "Advances in the Synthesis of Oligonucleotides by the Phosphoramidite Approach", published by Tetrahedron, vol. 48, No. 12, pp. 2223-2311, 1992.

Article by Beaucage, SL and Iyer, RP, entitled "The Functionalization of Oligonucleotides Via Phosphoramidite Derivatives", published by Tetrahedron, vol. 49, No. 10, pp. 1925-1963, 1993.

* cited by examiner

FUNCTIONALIZED POLYMER FOR OLIGONUCLEOTIDE PURIFICATION

FIELD OF THE INVENTION

This invention relates generally to methods for preparing chromatography sorbents for purification of analytes, particularly oligonucleotides, and methods of using the same.

BACKGROUND OF THE INVENTION

Chromatography is a widely used method for analyzing and purifying mixtures of compounds from diverse sources such as natural products, combinatorial libraries, pharmaceutical agents and derivatives thereof, and nucleic acids. Purification and analysis of nucleic acids in particular poses challenging resolution difficulties due to the amphiphilic nature of nucleic acid molecules.

Further, synthesis of oligonucleotides requires fast and reliable purification methods in order to increase the speed and efficiency of the synthesis of the full length products. Synthesis of longer oligonucleotides adds considerably to the challenges in purification and synthetic efficiency. A decrease in the time and expense for purification of products is desired.

Current oligonucleotide purification technologies are adapted to purification of "trityl on" oligonucleotides or "trityl off" oligonucleotides, typically involving use of a reversed phase separation step, utilizing the hydrophobicity of the trityl tag to remove failure sequences and impurities. Short oligonucleotides (generally less than 40 bases) can be purified using reversed phase HPLC using this method, and then can be detritylated and desalted. However, there is a need for efficient separation of "trityl on" from "trityl off" oligonucleotides in order to obtain the full length synthetic product, uncontaminated with failure sequences.

The use of "long oligonucleotides," longer than a 50 mer (i.e., having 50 or more bases or base pairs), is becoming more prevalent and desirable because the longer oligonucleotides are ideal candidates for both microarrays and gene synthesis applications. Kane, M. D., et al., (2000) *Nucleic Acids Res.* 28, 4552–4557. However, current techniques for purification, for example high performance liquid chromatography (HPLC) and cartridge purification, are not effective for longer oligonucleotides. Polyacrylamide Gel Electrophoresis (PAGE) is more amenable for longer oligonucleotides, however this method is time and labor intensive and is not suitable for high throughput applications.

Similarly, the presence of dye or fluorescent molecules or modified nucleotides on the oligonucleotides complicates the separation and purification. For example, on some occasions, fluorescent probes are linked to PCR probes that are extended by polymerase, producing a long or full length gene sequence having a fluorescent probe attached. Using conventional purification methods, such labeled oligonucleotides are retained on purification media either too much or too little, and clean separation from unlabeled oligonucleotides is not provided.

Oligonucleotide separation methods are known in the art. For example, Bonn et al. (U.S. Pat. No. 5,585,236) describe a chromatographic method for separating nucleic acids using nonporous polymer beads having an average diameter of 1–100 microns for ion pair reverse phase chromatographic separation when the polymer beads are alkylated with alkyl chains having at least three carbon atoms. In addition, this group reported the advantages of high resolution liquid chromatography of detritylated oligonucleotides on nonporous alkylated polystyrene divinylbenzene copolymers, Huber, D. G., et al., (1993) *Anal. Biochem.* 212, 351–358.

Similarly, Gjerde et al. (U.S. Pat. No. 6,355,791) describe a nonpolar polymeric chromatographic separation media in the form of beads or monoliths for the separation of mixtures of polynucleotides when the surfaces are substantially free of multivalent cation contamination. The chromatographic separation media are reported to be particularly useful for Matched Ion Polynucleotide Chromatography.

Moore et al., in U.S. patent application No. 2003/0055241, describe a method for purifying oligonucleotides that involves treating a solution with an aggregating agent and a precipitation enhancer, and isolating the purified oligonucleotide.

Separations based on a "fluorous phase" approach, as described in U.S. Pat. No. 6,156,896 to Curran et al., involve the use of silica gel bonded with perfluoroalkyl chains, for purification of highly fluorinated compounds. This technology is commercialized by Fluorous Technologies, Inc. (Pittsburgh, Pa.).

None of the references mentioned above satisfied the need in the art for a fast and convenient method for separating labeled or protected oligonucleotides from unlabeled or deprotected oligonucleotides. In particular, there is a need in the art for a practical and fast method for separating tritylated oligonucleotides from non-tritylated oligonucleotides.

SUMMARY OF THE INVENTION

The present inventors have made the surprising discovery that halogenated polymers comprising vinyl aromatic monomers substituted with hydrocarbyl or halocarbyl substituents comprising from 1 to 1,000,000 carbon atoms, or combinations thereof, possess adsorption characteristics that are useful for separating nonpolar or hydrophobic analytes, such as tritylated oligonucleotides, from more polar or hydrophilic analytes, such as detritylated oligonucleotides.

Accordingly, it is an object of the invention to provide halogenated polymers, in particular, for use as chromatography sorbent materials, for improving the separation between nonpolar analytes and between polar and non polar analytes.

It is a further object of the invention to provide methods for separating polar analytes from nonpolar analytes using the halogenated polymers of the invention.

It is a further object of the invention to provide halogenated polymers and methods for separating labeled nucleic acids from unlabeled nucleic acids, and in particular, for separating tritylated oligonucleotides from detritylated oligonucleotides.

It is yet a further object of the invention to provide a fast and convenient method for purifying a full length oligonucleotide from failure sequences and by products of deprotection.

Accordingly, in one embodiment, a halogenated polymer of vinyl aromatic monomers comprising styrene and divinylbenzene is provided for use in a chromatographic separation method of analytes. The halogenated polymer further comprises a hydrocarbyl or halocarbyl substituent comprising from 1 to 1,000,000 carbon atoms, or combinations thereof.

In a preferred embodiment, the halocarbyl substituent is fluorocarbyl and comprises from 1 to 100 carbon atoms. In certain other embodiments, the fluorocarbyl substituent comprises from 1 to 20 carbon atoms. In an even more preferred embodiment, the fluorocarbyl substituent is perfluorocarbyl. In exemplary embodiments, the fluorocarbyl substituent is perfluorcarbyl and is heptadecafluorooctyl or pentafluorobenzyl.

In another embodiment of the invention, the halogenated polymer is comprised of halogenated vinyl aromatic monomers. In a preferred embodiment, the vinyl aromatic monomers are brominated.

In another aspect of the invention, the polymer is further substituted with hydrocarbyl substituents comprising from 1 to 100 carbon atoms. In a more preferred aspect, the hydrocarbyl substituents comprise from 1 to 20 carbon atoms.

In a further embodiment of the invention, both the vinyl aromatic monomers and the hydrocarbyl substituents are halogenated.

The halogenated polymer is not limited to applications involving purification of oligonucleotides, but is useful in the chromatographic separation of analytes including, but not limited to, nucleic acids, peptides, carbohydrates, lipids, synthetic compounds or compounds from a combinatorial library, or combinations thereof.

The halogenated polymer provides increased adsorption or retention of more hydrophobic analytes relative to the adsorption or retention of less hydrophobic analytes. More hydrophobic analytes comprise hydrophobic moieties including, but not limited to fluorescent labels, quenching agents, dyes, lipids, hydrophobic peptides, hydrophobic drugs, vitamins, protecting groups, fluorinated moieties, haptens, or mixtures thereof. Other hydrophobic analytes include nucleic acids having a modified phosphate backbone, in particular nucleic acids having a phosphite triester or peptide backbone. In certain aspects of the invention, the hydrophobic moiety is cleavable from the analyte by acid, base, enzymatic action, oxidation, reduction, or light. Particularly preferred hydrophobic analytes include tritylated oligonucleotides, oligonucleotides labeled with amine linked dyes, biotinylated oligonucleotides, or cholesterylated oligonucleotides. In a most preferred embodiment, the halogenated polymer is useful in the chromatographic separation of analytes having a protecting group such as 4,4'-dimethoxytrityl, 4-monomethoxytrityl, or any other hydroxyl protecting group stable to oligonucleotide synthesis conditions, and the protecting group is removable using acid treatment.

In another aspect of the invention, a polymer bead comprising vinyl aromatic monomers functionalized by fluorocarbylation is provided for separating compounds. The polymer bead functionalized by fluorocarbylation exhibits improved retention of compounds comprising a hydrophobic moiety relative to the retention of compounds lacking said hydrophobic moiety.

In a preferred embodiment, the polymer bead is functionalized by the covalent attachment of a fluorocarbyl radical comprising from 1 to 100 carbon atoms. In another embodiment, the fluorocarbyl radical comprises from 1 to 20 carbon atoms, and in a preferred embodiment, the fluorocarbyl radical comprises from 1–12 carbon atoms. In an even more preferred embodiment, the fluorocarbyl radical is a perfluorocarbyl radical, such as heptadecafluorooctyl or pentafluorobenzyl.

In another aspect of the invention, a functionalized polymer bead comprising vinyl aromatic monomers is provided for separating compounds, wherein the vinyl aromatic monomers are substituted with hydrocarbyl moieties having from 1 to 1,000,000 carbon atoms, and wherein said polymer bead is functionalized by halogenation of the aromatic monomers. In a preferred embodiment, the hydrocarbyl moieties comprise from 1 to 100 carbon atoms, and in more preferred embodiment, the hydrocarbyl moieties comprise from 1 to 20 carbon atoms.

The functionalized polymer bead is preferably functionalized by bromination of the aromatic monomers. In a preferred embodiment, the functionalized polymer bead comprises brominated poly(styrene divinylbenzene) having hydrocarbyl substituents comprising 6 to 20 carbon atoms.

In an additional aspect of the invention, there is provided a method of separating a mixture of analytes, comprising (1) applying the mixture of analytes to a chromatography sorbent comprising polymer beads of aromatic vinyl monomers substituted with hydrocarbyl or halocarbyl substituents, or combinations thereof, comprising from 1 to 1,000,000 carbon atoms, wherein said aromatic vinyl monomers or said hydrocarbyl substituents or both have been functionalized by halogenation; and (2) removing polar analytes from the chromatography sorbent by a hydrophilic solvent wash.

Additional steps are optionally useful in the method, for example further eluting nonpolar analytes from the chromatography sorbent with a hydrophobic solvent wash. Alternatively, step (2) can be followed by performing a cleavage step on the chromatography sorbent, and eluting additional analytes from the chromatography sorbent. In certain embodiments, the cleavage and subsequent elution steps can be combined into a single step. The cleavage step can be performed by treating the chromatography sorbent with, inter alia, acid, base, enzymes, chemical cleavage agents, or light.

In a preferred embodiment, the halocarbyl substituent is a fluorocarbyl radical comprising from 1 to 100 carbons, or in certain embodiments, the halocarbyl substituent is a fluorocarbyl radical comprising from 1 to 20 carbons. In an additional embodiment, the halocarbyl substituent is a fluorocarbyl radical comprising from 1 to 12 carbons. In a particularly preferred embodiment, the fluorocarbyl substituent is a perfluorocarbyl radical comprising from 1 to 12 carbons.

In another embodiment, the aromatic vinyl monomers are functionalized by halogenation, in particular, by bromination.

The methods of the invention are useful for separating mixtures of analytes, including, but not limited to, nucleic acids, peptides, carbohydrates, lipids, synthetic compounds or compounds from a combinatorial library, or mixtures thereof.

Preferably, at least one of the analytes comprises a hydrophobic moiety, including but not limited to, a protecting group, a fluorescent label, an amine linked dye, a quenching agent, a lipid, a hapten, a fluorinated moiety, biotin, a hydrophobic peptide, a hydrophobic drug, or mixtures thereof. In a preferred embodiment, the hydrophobic moiety is cleavable from the analyte.

In certain embodiments, the mixture of analytes includes nucleic acids having a modified phosphate backbone (e.g., phosphite triester or peptide linked oligonucleotides), tritylated oligonucleotides, oligonucleotides labeled with amine linked dyes, biotinylated oligonucleotides, or cholesterylated oligonucleotides, or combinations thereof. In a particularly preferred embodiment, the mixture of analytes includes nucleic acids bearing a protecting group such as 4,4'-dimethoxytrityl, 4-monomethoxytrityl, although the method is applicable to any other hydroxyl protecting group stable to oligonucleotide synthesis conditions.

In another aspect, a chromatographic method is provided for separating labeled nucleic acids from unlabeled nucleic acids comprising:

(1) contacting a solution comprising labeled and unlabeled nucleic acids with a chromatography sorbent comprising a halogenated polymer of vinyl aromatic monomers substituted with hydrocarbyl or halocarbyl substituents, or combinations thereof, comprising from 1 to 1,000,000 carbon atoms, wherein said vinyl aromatic monomers or said hydrocarbyl substituents or both have been functionalized by halogenation; and (2) eluting unlabeled nucleic acids from the chromatography sorbent with a solvent wash.

Additional steps are possible, including eluting the labeled nucleic acids from the chromatography sorbent with a hydrophobic solvent wash, or treating the chromatography sorbent with a cleavage agent, followed by eluting additional nucleic acids from the chromatography sorbent. In certain embodiments, the cleavage and subsequent elution steps can be combined into a single step. The cleavage step can be performed by treating the chromatography sorbent with, inter alia, acid, base, enzymes, chemical cleavage agents, or light.

In an additional embodiment, the vinyl aromatic monomers are halogenated, preferably by bromination. In a preferred embodiment, the vinyl aromatic monomers comprise brominated styrene and divinylbenzene.

In yet another embodiment, the halocarbyl substituent is fluorocarbyl, and preferably is perfluorocarbyl.

Preferably, the labeled nucleic acids comprise a hydrophobic moiety including but not limited to a protecting group, a fluorescent label, an amine linked dye, a quenching agent, a lipid, a hapten, a fluorinated moiety, biotin, a modified phosphate backbone, a hydrophobic peptide, a hydrophobic drug, or mixtures thereof. In a particularly preferred embodiment, the hydrophobic moiety is cleavable, and is a protecting group such as 4,4'-dimethoxytrityl, 4-monomethoxytrityl, or any other hydroxyl protecting group stable to oligonucleotide synthesis conditions.

DETAILED DESCRIPTION OF THE INVENTION

I. Definitions and Overview

Figure 1:
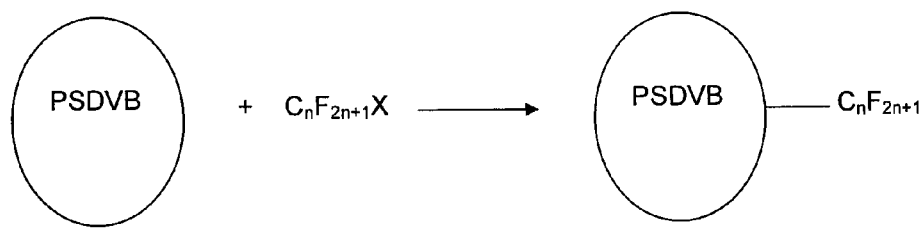
FIG. 1 illustrates schematically the fluorocarbylation of PSDVB beads.

Before describing the present invention in detail, it is to be understood that unless otherwise indicated this invention is not limited to specific polymers or synthetic methods, as such may vary. It is also to be understood that the terminology used herein is for the purpose of describing particular embodiments only, and is not intended to be limiting. It must be noted that, as used in this specification and the appended claims, the singular forms "a," "an," and "the" include plural referents unless the context clearly dictates otherwise. Thus, for example, reference to "a polymer" includes not only a single polymer but also a combination or mixture of two or more different polymers, and the like.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

In describing and claiming the present invention, the following terminology will be used in accordance with the definitions set out below.

The term "halogen" has the meaning as traditionally used in the art, referring generally to fluorine, chlorine, bromine and iodine. Specific embodiments will be discussed having particular properties attributable to the halogenation.

The term "hydrocarbyl" is used in its conventional sense to refer to a hydrocarbon group containing carbon and hydrogen, and may be straight or branched chain aliphatic, alicyclic or aromatic, or may contain a combination of aliphatic, alicyclic and/or aromatic moieties. Aliphatic and alicyclic hydrocarbyl may be saturated or they may contain one or more unsaturated bonds, typically double bonds. The hydrocarbyl substituents herein generally contain 1 to 1,000,000 carbon atoms, typically 1 to 100 carbon atoms, and more typically in the range of 1 to 20 carbon atoms. The hydrocarbyl substituent can be substituted with various substituents and functional groups, or may be modified so as to contain ether, thioether, —NH—, —NR, —C(O)—, —C(O)—O— and/or other linkages, where R is also hydrocarbyl, so long as the overall hydrophobic character of the substituent is not impaired. When a hydrocarbyl residue having a specific number of carbons is named, all geometric isomers having that number of carbons are intended to be encompassed; thus, for example, "butyl" is meant to include n-butyl, sec-butyl, isobutyl and t-butyl; "propyl" includes n-propyl and isopropyl.

The term "halogenated" and "halocarbyl" refers to replacement of a hydrogen atom in a hydrocarbyl substituent with a halogen atom. Generally, it is desirable to substitute a majority of the hydrogen atoms with halogens, although the degree of halogenation can be adjusted to suit the particular purpose and characteristics needed. The terms "hydrocarbylation," "halocarbylation" and "fluorocarbylation" refer to the addition of a hydrocarbyl, halocarbyl or fluorocarbyl substituent.

The terms "fluorinated" and "fluorocarbyl" refer to replacement of a hydrogen atom in a hydrocarbyl substituent with a halogen atom, and includes perfluorinated moieties. The term "perfluorinated" is used in its conventional sense to refer to the complete replacement of all hydrogen atoms with fluorine atoms. Thus, a "fluorinated" methyl group encompasses —$CH_2F$ and —$CHF_2$ as well as the "perfluorinated" methyl group —$CF_3$. In certain embodiments, when the halocarbyl substituent is aromatic, the term halocarbyl is intended to include heteroaromatic analogs.

The term "aromatic" as used herein refers to a radical containing one or more groups of atoms in a cyclic array that contains clouds of delocalized pi electrons above and below the plane of the atoms; furthermore, the pi clouds must contain a total of (4q+2)pi electrons, where q is any positive integer. "Aromatic" includes both aryl and heteroaryl rings as defined herein. Generally, although not necessarily, the heteroatoms are nitrogen, oxygen or sulfur. The aryl or heteroaryl ring may be further substituted by additional aliphatic or aromatic radicals. "Aliphatic" means a radical derived from a non aromatic C—H bond by removal of the hydrogen atom. The aliphatic radical may be further substituted by additional aliphatic or aromatic radicals as defined herein.

The terms "peptide" and "protein" are used interchangeably to mean a polymer in which the monomers are natural or unnatural amino acid residues joined together through amide bonds. The term "peptide backbone" means the series of amide bonds through which the amino acid residues are joined.

The terms "porous" and "nonporous" refer to the presence or absence of pores on the polymer particles. "Nonporous" means a polymer bead having surface pores of less than 30 Å in diameter as measured using a mercury porosity measurement method. "Porous" means a polymer bead having surface pores of at least 50 Å in diameter. Preferably, the porous beads have a pore size of at least 100 Å, and more preferably about 150 Å, and a surface area of about 900 $m^2/gm$, as determined by nitrogen adsorption.

The present inventors have made the surprising discovery that halogenated polymers comprising vinyl aromatic monomers substituted with hydrocarbyl or halocarbyl substituents comprising from 1 to 1,000,000 carbon atoms, or combinations thereof, possess adsorption characteristics that are useful for separating nonpolar or hydrophobic analytes, such as tritylated oligonucleotides, from more polar or hydrophilic analytes, such as detritylated oligonucleotides.

Accordingly, in one embodiment, a halogenated polymer of vinyl aromatic monomers comprising styrene and divinylbenzene is provided for use in a chromatographic separation method of analytes. The halogenated polymer further comprises a hydrocarbyl or halocarbyl substituent comprising from 1 to 1,000,000 carbon atoms, or combinations thereof.

In a preferred embodiment, the halocarbyl substituent is fluorocarbyl and comprises from 1 to 100 carbon atoms. In certain other embodiments, the fluorocarbyl substituent comprises from 1 to 20 carbon atoms. In an even more preferred embodiment, the fluorocarbyl substituent is perfluorocarbyl. In exemplary embodiments, the fluorocarbyl substituent is perfluorcarbyl and is heptadecafluorooctyl or pentafluorobenzyl.

In another embodiment of the invention, the halogenated polymer is comprised of halogenated vinyl aromatic monomers. In a preferred embodiment, the vinyl aromatic monomers are brominated. The polymer can be further substituted with hydrocarbyl substituents comprising from 1 to 100 carbon atoms. In a more preferred aspect, the hydrocarbyl substituents comprise from 1 to 20 carbon atoms. It is preferred that the aromatic monomers are brominated after substitution with hydrocarbyl substituents.

In a further embodiment of the invention, both the vinyl aromatic monomers and the hydrocarbyl substituents are halogenated.

The halogenated polymer is not limited to applications involving purification of oligonucleotides, but is useful in the chromatographic separation of analytes including, but not limited to, nucleic acids, peptides, carbohydrates, lipids, synthetic compounds or compounds from a combinatorial library, or combinations thereof.

The halogenated polymer provides increased adsorption or retention of more hydrophobic analytes relative to the adsorption or retention of less hydrophobic analytes. More hydrophobic analytes comprise hydrophobic moieties including, but not limited to fluorescent labels, quenching agents, dyes, lipids, hydrophobic peptides, hydrophobic drugs, vitamins, protecting groups, fluorinated moieties, haptens, or mixtures thereof. Other hydrophobic analytes include nucleic acids having a modified phosphate backbone, in particular nucleic acids having a phosphite triester or peptide backbone. In certain aspects of the invention, the hydrophobic moiety is cleavable from the analyte by acid, base, enzymatic action, oxidation, reduction, or light. Particularly preferred hydrophobic analytes include tritylated oligonucleotides, oligonucleotides labeled with amine linked dyes, biotinylated oligonucleotides, or cholesterylated oligonucleotides. In a most preferred embodiment, the halogenated polymer is useful in the chromatographic separation of analytes having a protecting group such as 4,4'-dimethoxytrityl, 4-monomethoxytrityl, or any other hydroxyl protecting group stable to oligonucleotide synthesis conditions, and the protecting group is removable using acid treatment.

The halogenated polymer is useful in chromatographic separation methods, including, but not limited, to ion pair reverse phase chromatography, high performance liquid chromatography, cartridge purification, gel chromatography (or size exclusion chromatography), thin layer chromatography or microfluidics applications incorporating a chromatographic component, and related chromatographic separation methods. Particularly preferred chromatographic separation methods for use with the halogenated polymer are high performance liquid chromatography and cartridge purification systems.

In another aspect of the invention, a polymer bead comprising vinyl aromatic monomers functionalized by fluorocarbylation is provided for separating compounds. The polymer bead functionalized by fluorocarbylation exhibits improved retention of compounds comprising a hydrophobic moiety relative to the adsorption of compounds lacking said hydrophobic moiety.

In a preferred embodiment, the polymer bead is functionalized by the covalent attachment of a fluorocarbyl radical comprising from 1 to 100 carbon atoms. In another embodiment, the fluorocarbyl radical comprises from 1 to 20 carbon atoms, and in a preferred embodiment, the fluorocarbyl radical comprises from 1–12 carbon atoms. In an even more preferred embodiment, the fluorocarbyl radical is a perfluorocarbyl radical, such as heptadecafluorooctyl or pentafluorobenzyl.

In another aspect of the invention, the diameter of the polymer bead is from about 1 to 200 microns. Preferably, the diameter of the polymer bead is from about 80 to about 160 microns. In another preferred embodiment, the diameter of the polymer bead is from about 1 to about 80 microns.

In another aspect of the invention, the polymer bead functionalized by fluorocarbylation is useful for separating mixtures of compounds including nucleic acids, peptides, carbohydrates, lipids, synthetic compounds or compounds from a combinatorial library, or mixtures thereof. The polymer bead functionalized by fluorocarbylation provides improved adsorption of compounds comprising a hydrophobic moiety, including but not limited to a fluorescent label, a quenching agent, a dye, a lipid, a hydrophobic peptide, a hydrophobic drug, a vitamin, a protecting group, a fluorinated moiety, a hapten, or mixtures thereof. In some embodiments, the compounds comprising a hydrophobic moiety are nucleic acids having a modified phosphate backbone, such as phosphite triester or peptide linked oligonucleotides. In other embodiments, the compounds comprising a hydrophobic moiety are tritylated oligonucleotides, oligonucleotides labeled with amine linked dyes, biotinylated oligonucleotides, or cholesterylated oligonucleotides. In preferred embodiment, the hydrophobic moiety is a protecting group. Particularly preferred is a 4,4'-dimethoxytrityl, 4-monomethoxytrityl or any other hydroxyl protecting group stable to oligonucleotide synthesis conditions. In other preferred embodiments, the hydrophobic moiety is cleavable from the analyte by acid, base, enzymatic action, oxidation, reduction, or light.

In another aspect of the invention, a functionalized polymer bead comprising vinyl aromatic monomers is provided for separating compounds, wherein the vinyl aromatic monomers are substituted with hydrocarbyl moieties having from 1 to 1,000,000 carbon atoms, and wherein said polymer bead is functionalized by halogenation of the aromatic monomers. In a preferred embodiment, the hydrocarbyl moieties comprise from 1 to 100 carbon atoms, and in more preferred embodiment, the hydrocarbyl moieties comprise from 1 to 20 carbon atoms.

The functionalized polymer bead is preferably functionalized by bromination of the aromatic monomers. It is preferred that bromination is performed after substitution of the aromatic monomers with hydrocarbyl substituents. In a preferred embodiment, the functionalized polymer bead comprises brominated poly(styrene divinylbenzene) having hydrocarbyl substituents comprising 6 to 20 carbon atoms.

In a particular embodiment, the functionalized polymer bead is useful for separating compounds including, but not limited to, nucleic acids, peptides, carbohydrates, lipids, synthetic compounds or compounds from a combinatorial library, or combinations thereof. The functionalized polymer bead preferably is used to separate compounds comprising a moiety such as a fluorescent label, a quenching agent, a dye, a lipid, a hydrophobic peptide, a hydrophobic drug, a vitamin, a protecting group, a fluorinated moiety, a hapten, or mixtures thereof, from compounds lacking these moieties. In one aspect, the functionalized polymer bead is useful for separating compounds including nucleic acids having a modified phosphate backbone. In another aspect, the functionalized polymer bead is useful for separating mixtures of compounds comprising phosphite triester or peptide linked oligonucleotides, tritylated oligonucleotides, oligonucleotides labeled with amine linked dyes, biotinylated oligonucleotides, or cholesterylated oligonucleotides. Preferably, the compounds are separated from compounds lacking these labels or structures. The functionalized polymer bead of the invention is particularly preferred for separating compounds comprising a protecting group such as a 4,4'-dimethoxytrityl, 4-monomethoxytrityl or any other hydroxyl protecting group stable to oligonucleotide synthesis conditions. In another aspect, the moiety is cleavable from the compound by acid, base, enzymatic action, oxidation or reduction (e.g., by chemical cleavage agents), or light.

In an additional aspect of the invention, there is provided a method of separating a mixture of analytes, comprising (1) applying the mixture of analytes to a chromatography sorbent comprising polymer beads of aromatic vinyl monomers substituted with hydrocarbyl or halocarbyl substituents, or combinations thereof, comprising from 1 to 1,000,000 carbon atoms, wherein said aromatic vinyl monomers or said hydrocarbyl substituents or both have been functionalized by halogenation; and (2) removing polar analytes from the chromatography sorbent by a hydrophilic solvent wash.

Additional steps are optionally useful in the method, for example further eluting nonpolar analytes from the chromatography sorbent with a hydrophobic solvent wash. Alternatively, step (2) can be followed by performing a cleavage step on the chromatography sorbent, and eluting additional analytes from the chromatography sorbent. In certain embodiments, the cleavage and subsequent elution steps can be combined into a single step. The cleavage step can be performed by treating the chromatography sorbent with, inter alia, acid, base, enzymes, chemical cleavage agents, or light.

In a preferred embodiment, the halocarbyl substituent is a fluorocarbyl radical comprising from 1 to 100 carbons, or in certain embodiments, the halocarbyl substituent is a fluorocarbyl radical comprising from 1 to 20 carbons. In an additional embodiment, the halocarbyl substituent is a fluorocarbyl radical comprising from 1 to 12 carbons. In a particularly preferred embodiment, the fluorocarbyl substituent is a perfluorocarbyl radical comprising from 1 to 12 carbons.

In another embodiment, the aromatic vinyl monomers are functionalized by halogenation, in particular, by bromination.

The methods of the invention are useful for separating mixtures of analytes, including, but not limited to, nucleic acids, peptides, carbohydrates, lipids, synthetic compounds or compounds from a combinatorial library, or mixtures thereof.

Preferably, at least one of the analytes comprises a hydrophobic moiety, including but not limited to, a protecting group, a fluorescent label, an amine linked dye, a quenching agent, a lipid, a hapten, a fluorinated moiety, biotin, a hydrophobic peptide, a hydrophobic drug, or mixtures thereof. In a preferred embodiment, the hydrophobic moiety is cleavable from the analyte.

In certain embodiments, the mixture of analytes includes nucleic acids having a modified phosphate backbone (e.g., phosphite triester or peptide linked oligonucleotides), tritylated oligonucleotides, oligonucleotides labeled with amine linked dyes, biotinylated oligonucleotides, or cholesterylated oligonucleotides, or combinations thereof. In a particularly preferred embodiment, the mixture of analytes includes nucleic acids bearing a protecting group such as 4,4'-dimethoxytrityl, 4-monomethoxytrityl, although the method is applicable to any other hydroxyl protecting group stable to oligonucleotide synthesis conditions.

In another aspect, a chromatographic method is provided for separating labeled nucleic acids from unlabeled nucleic acids comprising:

(1) contacting a solution comprising labeled and unlabeled nucleic acids with a chromatography sorbent comprising a halogenated polymer of vinyl aromatic monomers substituted with hydrocarbyl or halocarbyl substituents, or combinations thereof, comprising from 1 to 1,000,000 carbon atoms, wherein said vinyl aromatic monomers or said hydrocarbyl substituents or both have been functionalized by halogenation; and (2) eluting unlabeled nucleic acids from the chromatography sorbent with a solvent wash.

Additional steps are possible, including eluting the labeled nucleic acids from the chromatography sorbent with a hydrophobic solvent wash, or treating the chromatography sorbent with a cleavage agent, followed by eluting additional nucleic acids from the chromatography sorbent. In certain embodiments, the cleavage and subsequent elution steps can be combined into a single step. The cleavage step can be performed by treating the chromatography sorbent with, inter alia, acid, base, enzymes, chemical cleavage agents, or light.

In an additional embodiment, the vinyl aromatic monomers are halogenated, preferably by bromination. In a preferred embodiment, the vinyl aromatic monomers comprise brominated styrene and divinylbenzene. In a more preferred embodiment, bromination of the chromatography sorbent is performed after substitution of the halogenated polymer with the hydrocarbyl or halocarbyl substituents.

In yet another embodiment, the halocarbyl substituent is fluorocarbyl, and preferably is perfluorocarbyl.

Preferably, the labeled nucleic acids comprise a hydrophobic moiety including but not limited to a protecting group, a fluorescent label, an amine linked dye, a quenching agent, a lipid, a hapten, a fluorinated moiety, biotin, a modified phosphate backbone, a hydrophobic peptide, a hydrophobic drug, or mixtures thereof. In a particularly preferred embodiment, the hydrophobic moiety is cleavable, and is a protecting group such as 4,4'-dimethoxytrityl, 4-monomethoxytrityl, or any other hydroxyl protecting group stable to oligonucleotide synthesis conditions.

II. Chromatography Sorbents

Generally, the invention provides a halogenated polymer comprising styrene and divinylbenzene substituted with hydrocarbyl or halocarbyl substituents, or combinations thereof, comprising from 1 to 1,000,000 carbon atoms, for use as a chromatography sorbent. The halogenation can be present in the form of halocarbyl substituents present on the vinyl aromatic monomers, or in the form of halogen atoms on the aromatic monomers, or both.

Surprisingly, the halogenated polymer provides increased adsorption or retention of analytes comprising a hydrophobic moiety relative to the adsorption or retention of analytes lacking a hydrophobic moiety, thereby providing a means for separating analytes comprising the hydrophobic moiety from analytes lacking the hydrophobic moiety present in a sample.

In certain aspects, the halogenated polymer is provided in the form of polymer beads comprising vinyl aromatic monomers functionalized by fluorocarbylation are provided for separating compounds. The polymer bead functionalized by fluorocarbylation exhibits improved adsorption of compounds comprising a hydrophobic moiety relative to the adsorption of compounds lacking said hydrophobic moiety. Preferably, the polymer bead is functionalized by the covalent attachment of a fluorocarbyl radical comprising from 1 to 100 carbon atoms. In another embodiment, the fluorocarbyl radical comprises from 1 to 20 carbon atoms, and in a preferred embodiment, the fluorocarbyl radical comprises from 1–12 carbon atoms. In an even more preferred embodiment, the fluorocarbyl radical is a perfluorocarbyl radical, exemplified by heptadecafluorooctyl or pentafluorobenzyl.

In certain other aspects of the invention, the aromatic vinyl monomers are functionalized by halogenation, in particular, by bromination, and the aromatic monomers are further substituted with hydrocarbyl substituents comprising from 1 to 100 carbon atoms. In a more preferred embodiment, the hydrocarbyl moieties comprise from 1 to 20 carbon atoms. The functionalized polymer bead is preferably functionalized by bromination of the aromatic monomers. In a preferred embodiment, the functionalized polymer bead comprises brominated poly(styrene divinylbenzene) having hydrocarbyl substituents comprising 6 to 20 carbon atoms.

A. Polymers

Polymers useful in the invention generally comprise vinyl aromatic monomers that can be polymerized into a polymer chain that is stable under a wide range of solvent conditions, temperatures and pH. Preferably, the vinyl aromatic monomers comprise styrene and divinylbenzene. However, the terms "styrene" and "divinylbenzene" are used in a general sense to refer to styrene monomers and divinyl derivatives of styrene having a vinyl substituent of at least two carbons, and these terms include longer vinyl hydrocarbyl substituents, such as ethylvinylbenzene, so long as the vinyl group can participate in polymerization. Generally, aromatic monomers having vinyl substituents, optionally substituted with hydrocarbyl or halocarbyl substituents having from 1 to 100 carbons, are suitable. In addition, the term "vinyl aromatic monomers" refers to analogous monomers comprised of bicyclic and polycyclic aromatic structures in lieu of styrene's phenyl substituent. Vinyl derivatives of heteroaromatic compounds such as pyridine, isoquinoline, quinoline, imidazole, isoxazole, oxazole, thiazole, and pyrazole, for example, are also included in the definition of styrene and divinylbenzene so long as the heteroaromatic derivative forms a polymer of the requisite stability to synthetic conditions and solvents, for example, those encountered during oligonucleotide synthesis and purification.

Preferred vinyl aromatic monomers include styrene, divinylbenzene, ethylvinylbenzene, and may further comprise additional vinyl monomers so long as the hydrophobic character of the polymer is unaffected. Additional monomers can also be present, such as aryl acrylates and methacrylates (for example, methyl acrylate, methyl methacrylate, n-butyl acrylate, n-butyl methacrylate, t-butyl acrylate, t-butyl methacrylate, 2-ethylhexyl methacrylate, benzyl acrylate and N-phenylacrylamide); vinyl aromatics, including unsubstituted styrene and styrene substituted with one or two lower alkyl, halogen or hydroxyl groups (for example, styrene derivatives such as 4-vinyltoluene, 4-vinylphenol, alpha-methylstyrene, 2,5-dimethylstyrene, 4-t-butylstyrene and 2-chlorostyrene); butadiene; vinyl acetate; vinyl bromide; vinylidene chloride; halogenated analogs of any of the foregoing, e.g., fluorinated acrylic and methacrylic acid esters (e.g., fluorinated alkyl acrylates, fluorinated aryl acrylates, fluorinated alkyl methacrylates and fluorinated aryl methacrylates); and others readily apparent to one skilled in the art.

The present copolymers may be readily synthesized using methods described in the pertinent texts and literature, or as known to those of ordinary skill in the art. Methods for preparing polymers comprising styrene and divinylbenzene and similar vinyl aromatic monomers are described in, for example, U.S. Pat. Nos. 5,585,236 to Bonn, and 6,355,791 to Gjerde, and references cited therein. One of ordinary skill in the art will recognize that the experimental methodologies described herein and in the literature are applicable to a wide range of monomeric and polymeric structures.

The halogenated polymers provided herein can be prepared by radical copolymerization, using a suitable free radical initiator. The initiator may be any conventional free radical-generating polymerization initiator. Examples of suitable initiators include peroxides such as O-t-amyl-O-(2ethylhexyl)monoperoxycarbonate, dipropylperoxydicarbonate, and benzoyl peroxide (BPO) as well as azo compounds such as azobisisobutyronitrile (AIBN), 2,2'-azobis (2-amidino-propane)dihydrochloride, and 2,2'-azobis (isobutyramide)dihydrate. The initiator is generally present in the polymerization mixture in an amount of from about 0.2 to 5% by weight of the monomers.

B. Halogenation of Polymers

Polymers useful in the invention can be halogenated by polymerization of halosubstituted vinyl aromatic monomers, by halocarbylation of the polymer, by halogenation of the aromatic nuclei, or combinations thereof.

1. Halocarbylation

Halocarbylation is readily provided by mixing the polymer beads with a halocarbyl halide in the presence of a Friedel-Crafts catalyst to effect electrophilic aromatic substitution on the aromatic rings at the surface of the polymer bead. Suitable Friedel-Crafts catalysts are well known in the art and include Lewis acids such as aluminum chloride, boron trifluoride, tin tetrachloride, etc.

In a preferred embodiment, the halogenated polymer is functionalized by the covalent attachment of a fluorocarbyl radical, and in a particularly preferred embodiment, by the covalent attachment of a perfluorocarbyl radical. Perfluorocarbyl groups can be introduced into the polymer core of poly (styrene divinylbenzene) by any method known in the art. Perfluoroalkylation can be achieved by mixing the polymer beads with the perfluoroalkyl halide in the presence of a Friedel-Crafts catalyst to effect electrophilic aromatic substitution on the aromatic rings at the surface of the polymer bead. Suitable Friedel-Crafts catalysts are well known in the art and include Lewis acids such as aluminum chloride, boron trifluoride, tin tetrachloride, etc. Thus, the polymer can be perfluorocarbylated by contacting the beads with a perfluorocarbylating agent, such as a perfluorocarbyl halide having the desired number of carbon atoms. Suitable perfluorocarbyl halides are straight-chain or branched perfluoroalkyl chlorides, bromides and iodides containing 1–100 carbon atoms, preferably 1–20, more preferably 1–12 carbon atoms, and most preferably 6–12 carbon atoms. For example, and for illustrative purposes only, suitable fluorocarbylating agents include, without limitation, perfluoroethyl iodide, perfluoropropyl iodide, perfluorohexyl bromide, perfluoroheptyl bromide, perfluorooctyl bromide, perfluorooctyl iodide, 1,1,1,2,2,3,3,4,4,5,5,6,6,7,7,8,8-heptadecafluoro-10-iododecane, perfluorodecyl iodide, perfluorododecyl iodide, heptadecafluorooctyl bromide, perfluoroisopropyl iodine, pentafluorobenzyl bromide, and 1,1,1,2,2,3,3,4,4,5,5,6,6,7,7,8,8-heptadecafluoro-10-iododecane.

Perfluorocarbylation of the polymer beads increases the hydrophobicity of the polymer beads and increases the desired adsorption of hydrophobic moieties such as trityl groups or fluorescent dyes to the surface of the polymeric beads, and improves the separation efficiency of the present method for labeled and unlabeled oligonucleotides. It will be appreciated by one skilled in the art that one or more fluorine atoms can be replaced by hydrogen atoms, without departing from the spirit and scope of the invention. Likewise, the fluorocarbylating agent can have double or triple bonds between carbon atoms, so long as the desired hydrophobicity characteristics of the halogenated polymer are retained.

In a preferred embodiment, a 1-haloperfluorocarbyl group (e.g., group having the formula $C_nF_{2n+1}X$, where n is from 1 to 100 and X is Cl, Br or I) is introduced into the polymer comprising styrene and divinylbenzene by a Friedel-Craft alkylation reaction as shown in FIG. 1. More preferably, n is from 1 to 20, and more preferably, n is 1 to 12. In a particular embodiment, a 1-bromoheptadecafluorooctane group is introduced into the polymer comprising PSDVB, providing a heptadecafluorooctane group onto PSDVB. In an alternative embodiment, a pentafluorobenzyl derivative is prepared.

Although the preferred method for fluorocarbylating the halogenated polymer beads of the present invention is fluorocarbylation after the polymer bead has been formed, an alternative method of fluorocarbylation is to polymerize fluorocarbylated monomers to obtain a fluorocarbylated polymer bead. In this embodiment, the monomers are substituted with fluorocarbyl groups having from 1–100 carbon atoms, preferably 1–20, more preferably 1–12 carbon atoms, and most preferably 6–12 carbon atoms, to provide a perfluorocarbylated polymer bead.

2. Halogenation of the Vinyl Aromatic Monomers

Halogenation of the vinyl aromatic monomers can be performed by any method known in the art. Preferably the halogenation reaction is effected by electrophilic aromatic halogenation so that the halogen substitutions are present on the aromatic moiety of the polymer, but not present on the linkers between the aromatic monomers.

Preferably the vinyl aromatic monomers are brominated. Brominated polystyrenes are well known in the art as having flame retardant properties, and there are numerous synthetic routes to prepare brominated polystyrenes, for example, by bromine or bromine chloride in the presence of a Lewis acid catalyst (typically $AlCl_3$ or $SbCl_3$). Brominated polystyrenes can also be prepared from brominated monomers, prior to polymerization, as described in U.S. Pat. No. 6,518,368 to Gill. In the flame retardant art, it is generally preferred that the aromatic monomers are halogenated because aliphatic bromine is thought to be less thermally stable than aromatic bromine. For additional background and synthetic procedures, see, for example, U.S. Pat. Nos. 6,521,714, 4,352,909 to Barda, 5,882,551 to Dever, and 6,518,368 to Gill, and references cited therein.

Figure 2:
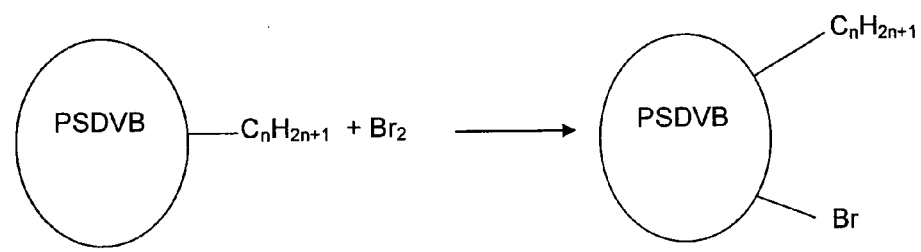
FIG. 2 illustrates schematically the bromination of C-18 PSDVB beads.

For purposes of the present invention, most preferably, a brominated polymer is prepared wherein the vinyl aromatic monomers comprise hydrocarbyl substituents of 1 to 100 carbon atoms, and wherein the monomers are brominated in accordance with the procedure described by Tallarico, J. A., et al., (2001) *J. Comb. Chem.* 3, 312–318, utilizing a thallium-acetate catalyst to effect electrophilic aromatic bromination. This reaction is shown schematically in FIG. 2. Briefly, the procedure involves suspending the polymer to be brominated in a solvent (typically dichloroethane), adding Thallium (III) acetate, and lastly, adding bromine. All steps are performed under nitrogen at room temperature. After a period of time to allow the reaction to proceed, usually several hours, the reaction is quenched by the addition of 10 mL methanol, and the polymer is washed to remove residual reactants.

III. Methodo of Use

The halogenated polymers of the invention are useful in the generation of chromatography sorbents, both for conventional forms of chromatography and for microfluidics applications, where the polymer sorbent is placed on planar surfaces or within microchannels, and used in conjunction with electrical fields or other combinations of other forms of chromatography and analyte detection.

A. Preparation of Columns

Methods of preparing columns for gel chromatography, thin layer chromatography and the like are well known in the art. The halogenated polymers of the invention are particularly advantageous for use as chromatography sorbents for HPLC and cartridge purification systems for nucleic acids.

B. Analytes

Analytes that are separated using the halogenated polymers of the invention include, but are not limited to, nucleic acids, peptides, carbohydrates, lipids, synthetic compounds, compounds from a combinatorial library or combinations thereof.

Nucleic acids include DNA and RNA in any form, including the use of modified bases or linkages, antisense sequences, interfering RNAs, triplex forming sequences, synthetic oligomers, full length genes, restriction fragments, or fragments of genomic DNA, without limitation. The term "oligonucleotide" is also encompassed within the definition of nucleic acids, and generally refers to shorter sequences, typically less than a thousand bases. Generally, it is contemplated that the nucleic acids be in single stranded form, although under some solvent conditions, double stranded nucleic acids can be separated as well.

Particularly preferred analytes include nucleic acids, preferably synthetic oligonucleotides that are tritylated, or labeled with any other hydroxyl protecting group that is stable to oligonucleotide synthesis conditions. Use of the halogenated polymers of the invention provides a means for separating full length oligonucleotide sequences from failure sequences, lacking the protecting group (e.g., MMT, DMT). The halogenated polymers described herein provide excellent selectivity between DMT-on and DMT-off and MMT-on and MMT-off oligonucleotides, for example, which leads to a higher purity of full length oligonucleotide. The new polymers exhibit remarkable capacity for the retention of oligonucleotides, which results in use of a lower bed mass of polymer and greater efficiency in larger scale purifications.

Additional preferred analytes include nucleic acids labeled with fluorescent or dye labels, cholesterylated nucleic acids, biotinylated nucleic acids, or nucleic acids labeled with a perfluorinated moiety.

Peptides that can be separated using the halogenated polymers of the invention include full length native proteins, modified with sugars, sialic acid residues or acylated, or the like, as well as proteolytic fragments, or synthetic peptides. Preferably, the peptide is labeled with a hydrophobic label such as a fluorescent probe, signal peptide or trityl moiety that is strongly retained on the halogenated polymer, facilitating separation from other mixture components.

Carbohydrates are another class of compounds that can be analyzed using the present halogenated polymers. Preferably, one or more carbohydrate component possesses a hydrophobic label or lipid component that will be strongly retained by the halogenated polymer.

Lipidic substances are another class of compounds that can be analyzed using the halogenated polymers described herein. Examples of lipid substances include phospholipids, cholesterol, sphingolipids, glycolipids, waxes, oils, triglycerides, and the like. Particularly preferred examples of lipid substances include compounds to which lipids have been attached, such as cholesteryl-modified nucleic acids. Additional examples include compounds that have been modified to include fatty acylation (e.g., ester linked acyl chains of 6 to 30 carbon atoms), prenylation (e.g., covalent attachment of farnesyl or geranylgeranyl groups), and the like.

Similarly, the halogenated polymers are useful in the analysis of compounds produced partly or entirely by synthetic processes. The separation of a desired synthetic product from reaction by-products is facilitated by attaching a hydrophobic tag such as trityl or a perfluorinated moiety to selectively retain compounds of interest.

Similarly, the halogenated polymers are useful in the analysis of compounds from a combinatorial library, including libraries of peptides, oligonucleotides, carbohydrates, and the like, as well as libraries of polyketides or natural product-like compounds, such as described in Tan, D. S., et al., (1998) *J. Am. Chem. Soc.* 120, 8565.

B. Hydrophobic Moieties

The separation of analytes using the halogenated polymers described herein is useful for more hydrophobic analytes comprising a hydrophobic moiety such as fluorescent labels, quenching agents, dyes, lipids, hydrophobic peptides, hydrophobic drugs, vitamins, protecting groups, fluorinated moieties, haptens, or mixtures thereof. In some instances, the more hydrophobic analytes are nucleic acids having a modified phosphate backbone that reduces the charge on the nucleic acid and renders it less hydrophilic, such as nucleic acids having phosphite triesters, phosphorothioate linkages or peptide linked oligonucleotides, as well as other linkages discussed below. Particularly preferred are nucleic acids that can be separated using the halogenated polymers of the invention. These include nucleic acids modified by protecting groups (e.g., tritylated oligonucleotides), oligonucleotides labeled with amine linked dyes, biotinylated oligonucleotides, or cholesterylated oligonucleotides.

In some instances, it is desirable that the hydrophobic moiety can be cleaved from the analyte by treatment while still adsorbed to the halogenated polymer. Conventional treatments to effect cleavage include acid, base, enzymatic action, oxidation, reduction, and light. In a preferred embodiment, tritylated oligonucleotides can be treated with acid (typically trifluoracetic acid) while adsorbed to the chromatography sorbent to effect the release of the trityl group from the oligonucleotide, leaving the oligonucleotide free to elute from the chromatography sorbent. Similarly, a hydrophobic moiety covalently attached via an amide bond can be cleaved by appropriate protease treatment. Cleavage of a disulfide linked moiety can be effected by reduction of the disulfide bond (e.g., using mercaptoethanol or dithiothreitol). The cleavable linker can also be a sulfone (cleavable under basic conditions), or an ester (cleavable under basic or nucleophilic conditions). The sorbent with the adsorbed analyte can be irradiated with ultraviolet nm light to effect removal of a photolabile protecting groups or other hydrophobic moieties (e.g., irradiation at 320 nm to cleave the p-nitrobenzyl ether protecting group).

1. Protecting Groups

Oligonucleotide synthesis requires protection of the 3' or 5'hydroxyl residues. A general description of oligonucleotide synthesis can be found in Sambrook, J. and Russell, D. W., *Molecular Cloning*, Cold Spring Harbor Laboratory Press, Cold Spring Harbor, N.Y. (2002).

Hydroxyl protecting groups generally are easily removable groups which are known in the art to protect a hydroxyl group against undesirable reaction during synthetic procedures and to be selectively removable. The use of hydroxyl protecting groups is well known in the art, and many such protecting groups are known. See, for example, T. H. Greene and P. G. M. Wuts, Protective Groups in Organic Synthesis, 2nd edition, John Wiley & Sons, New York (1991), the contents of which are hereby incorporated herein by reference. Examples of hydroxyl protecting groups include ether moieties, such as methyl; substituted methyl ether moieties, such as methoxymethyl (MOM), methylthiomethyl (MTM), 2-methoxyethoxymethyl (MEM), bis(2-chloroethoxy)methyl, tetrahydropyranyl (THP), tetrahydrothiopyranyl, 4-methoxytetrahydropyranyl, 4-methoxytetrahydrothiopyranyl, tetrahydrofuranyl, tetrahydrothiofuranyl, and the like; substituted ethyl ether moieties, such as 1-ethoxyethyl, 1-methyl-1-methoxyethyl, 2-(phenylselenyl)ethyl, t-butyl, allyl, benzyl, o-nitrobenzyl, triphenylmethyl, alpha-naphthyldiphenyl methyl,p-methoxyphenyldiphenylmethyl, 9-(9-phenyl-10-oxo)anthranyl (tritylone), and the like; silyl ether moieties, such as trimethylsilyl (TMS), isopropyldimethylsilyl, t-butyldimethylsilyl (TBDMS), t-butyldiphenylsilyl, tribenzylsilyl, tri-p-xylylsilyl, triisopropylsilyl, and the like; ester moieties, such as formate, acetate, trichloroacetate, phenoxyacetate, isobutyrate, pivaloate, adamantoate, benzoate, 2,4,6-trimethylbenzoate, and the like; and carbonate moieties, such as methyl, 2,2,2-trichloroethyl, allyl, p-nitrophenyl, benzyl,p-nitrobenzyl, S-benzyl thiocarbonate, and the like.

A preferred category of hydroxyl protecting groups for use during the synthesis of oligonucleotides is trityl, wherein the 3' or 5' protected oligonucleotides comprise 4,4'-dimethoxytrityl, 4-monomethoxytrityl, or trimethoxytrityl. Additional preferred protecting groups include pixyl, wherein the 3' or 5' protected oligonucleotides comprise 9-phenylxanthen-9-yl (pixyl); or moxyl, wherein the 3' or 5' protected oligonucleotides comprise 9-(p-methoxyphenyl) xanthen-9-yl (Mox). Any additional hydroxyl protecting groups that are stable to oligonucleotide synthesis conditions (e.g., basic conditions) and that provide a hydrophobic tag can be also useful herein. However, for analytes other than synthetic oligonucleotides, additional protecting groups or labels that are not necessarily stable to oligonucleotide synthesis conditions can also be used.

A number of chemical functional groups can be introduced directly or indirectly attached at the heterocyclic base and the sugar substituents at the 2', 3' and 5'-positions. In general, a blocking group renders a chemical functionality of a larger molecule inert to specific reaction conditions and can later be removed from such functionality without substantially damaging the remainder of the molecule (Green and Wuts, Protective Groups in *Organic Synthesis*, 2d edition, John Wiley & Sons, New York, 1991). For example, the nitrogen atom of amino groups can be blocked as phthalimido groups, as 9-fluorenylmethoxycarbonyl (FMOC) groups, and with triphenylmethylsulfenyl, t-BOC or benzyl groups. Carboxyl groups can be protected as acetyl groupcds.

Amino-protecting groups stable to acid treatment are selectively removed with base treatment, and are used to make reactive amino groups selectively available for substitution. Examples of such groups are the Fmoc (E. Atherton and R. C. Sheppard in *The Peptides*, S. Udenfriend, J. Meienhofer, Eds., Academic Press, Orlando, 1987, volume 9, p.1), and various substituted sulfonylethyl carbamates exemplified by the Nsc group (Samukov et al., *Tetrahedron Lett*, 1994, 35:7821; Verhart and Tesser, *Rec. Trav. Chim. Pays-Bas*, 1987, 107:621). Additional amino-protecting groups include but are not limited to, carbamate-protecting groups, such as 2-trimethylsilylethoxycarbonyl (Teoc), 1-methyl-1-(4-biphenylyl)ethoxycarbonyl (Bpoc), t-butoxycarbonyl (BOC), allyloxycarbonyl (Alloc), 9-fluorenylmethyloxycarbonyl (Fmoc), and benzyloxycarbonyl (Cbz); amide-protecting groups, such as formyl, acetyl, trihaloacetyl, benzoyl, and nitrophenylacetyl; sulfonamide-protecting groups, such as 2-nitrobenzenesulfonyl; and imine- and cyclic imide-protecting groups, such as phthalimido and dithiasuccinoyl. Equivalents of these amino-protecting groups are also encompassed by the compounds and methods of the present invention.

In some especially preferred embodiments, one or more of the internucleoside linkages comprising oligomeric compounds of the invention are optionally protected phosphorothioate internucleoside linkages. Representative protecting groups for phosphorus containing internucleoside linkages such as phosphite, phosphodiester and phosphorothioate linkages include beta-cyanoethyl, diphenylsilylethyl, delta-cyanobutenyl, cyano p-xylyl (CPX), N-methyl-N-trifluoro-acetyl ethyl (META), acetoxy phenoxy ethyl (APE) and butene-4-yl groups. See for example U.S. Pat. No. 4,725,677 and U.S. Pat. No. Re. 34,069 (beta-cyanoethyl); Beaucage, S. L. and Iyer, R. P., (1993) *Tetrahedron*, 49 No. 10, pp. 1925–1963; Beaucage, S. L. and Iyer, R. P., (1993) *Tetrahedron*, 49 No. 46, pp. 10441–10488; Beaucage, S. L. and Iyer, R. P., (1992) *Tetrahedron*, 48 No. 12, pp. 2223–2311.

2. Dyes, Fluorescent Probes and Quenching Agents

Dyes, fluorescent probes and quenching agents can all be covalently attached to an analyte that it is desired to separate from a mixture of other analytes. Suitable labels include dyes as well as fluorescent probes. A brief and nonlimiting list of fluorescent probes includes acridinium esters (AE); fluoresceins, e.g., fluorescein isothiocyanate (FITC), 6-carboxyfluorescein (6-FAM), 2',7'-dimethoxy-4',5'-dichloro-6-carboxyfluorescein (JOE), 6-carboxy-2',4',7',4,7-hexachlorofluorescein (HEX), 5-carboxyfluorescein (5-FAM); rhodamines, e.g., 6-carboxy-X-rhodamine (ROX), N,N,N',N'-tetramethyl-6-carboxyrhodamine (TAMRA), Texas Red; dipyrromethenboron difluoride dyes (described in U.S. Pat. Nos. 4,774,339 to Haugland et al., 5,187,288 to Kang et al., 5,248,782 to Haugland et al., 5,274,113 to Kang et al., 5,451,663 to Kang et al., and 5,433,896 to Kang et al. and commercially available from Molecular Probes, Inc. (Eugene, Oreg.)), phycoerythrins, and allophycocyanins, without limitation. Additional dyes that are useful are the perfluorinated dyes described in U.S. Pat. No. 6,447,749 to Licha described as contrast media for near IR diagnosis procedures.

Amine linked labels are useful for nucleic acid purification, for example, 2'-Deoxycytidine-5-C6 Amino Linker (5' or Internal), Thymidine-5-C6 Amino Linker (Internal), C7 Internal Amino Linkers, 5' Biotin, Cholesteryl TEG 5' terminus, psoralen, quenchers such as DABSYL CE, DABCYL-dT, or QSY 21. These exemplary and non limiting amine linked labels are available commercially from TriLink BioTechnologies, Inc. (San Diego, Calif.).

3. Modified Backbone Oligonucleotides

Nucleic acids, particularly oligonucleotides, can be prepared with modified backbone linkages between the bases. Oligonucleotides can be prepared with the naturally occurring phosphate ester between bases replaced with phosphite esters, which though less stable, have a less polar character. Similarly, oligonucleotides having phosphorothioate linkages are commonly prepared because if their resistance to nucleases. Because of the presence of a sulfur atom in the phosphorothioate group, polarity is decreased, and retention on chromatographic sorbents is affected. Nucleic acids linked by peptide linkages are also known. Peptide nucleic acids have been shown to have higher binding affinities (as determined by their melting temperatures) for both DNA and RNA in comparison to that of unmodified DNA or RNA because the neutrality of the peptide backbone minimizes the electrostatic repulsion that exists when the natural forms of DNA and RNA hybridize. This increase in binding affinity makes these peptide nucleic acid oligomers especially useful as molecular probes and diagnostic agents for nucleic acid species.

In addition to the naturally occurring phosphodiester linking group, phosphorus and non-phosphorus containing linking groups can be used to prepare oligonucleotides, oligonucleosides and oligomeric chimeric compounds.

Additional linkages include phosphorus as well as non-phosphorus containing linkages, such as the following:

Phosphorus Containing Linkages:

phosphorodithioate (—O—P(S)(S)—O—); phosphorothioate (—O—P(S)(O)—O—); phosphoramidate (—O—P(O)(NZ)-O—); phosphonate (—O—P(Z)(O)—O—);

phosphotriesters (—O—P(OZ)(O)—O—); phophosphoramidate (—O—P(O)(NZ)-S—);

thionoalkylphosphonate (—O—P(S)(Z)-O—); thionoalkylphosphotriester (—O—P(O)(OZ)-S—);

boranophosphate (—R$_5$tP(O)(O)-Z-);

Non-phosphorus Containing Linkages:

thiodiester (—O—C(O)—S—); thionocarbamate (—O—C(O)(NZ)-S—);

siloxane (—O—Si(Z)$_2$-O—); carbamate (—O—C(O)—NH— and —NH—C(O)—O—) sulfamate (—O—S(O)(O)—N— and —N—S(O)(O)—N—; morpholino sulfamide (—O—S(O)(N(morpholino)-); sulfonamide (—O—SO$_2$—NH—); sulfide (—CH$_2$—S—CH$_2$—);

sulfonate (—O—SO$_2$—CH$_2$—); N,N'-dimethylhydrazine (—CH$_2$—N(CH$_3$)—N(CH$_3$)—);

thioformacetal (—S—CH$_2$—O—); formacetal (—O—CH$_2$—O—); thioketal (—S—C(Z)$_2$-O—); and ketal (—O—C(Z)$_2$-O—); amine (—NH—CH$_2$—CH$_2$—); hydroxylamine (—CH$_2$—N(Z)-O—); hydroxylimine (—CH=N—O—); and hydrazinyl (—CH$_2$—N(H)—N(H)—), where "Z" denotes a substituent group which is commonly hydrogen or an alkyl group, but which can vary from one type of linkage to another.

In addition to linking groups as described above that involve the modification or substitution of one or more of the —O—P(O)$_2$—O— atoms of a naturally occurring linkage, linking groups may include modification of the 5'-methylene group as well as one or more of the atoms of the naturally occurring linkage. Linkages of this type include, without limitation, the following:

amides (—CH$_2$—CH$_2$—N(H)—C(O)) and —CH$_2$—O—N=CH—; and alkylphosphorus (—C(Z)$_2$-P(=O)(OZ)-C(Z)$_2$-C(Z)$_2$-), wherein Z is as described above.

Synthetic schemes for the synthesis of the substitute internucleoside linkages described above are disclosed in: WO 91/08213; WO 90/15065; WO 91/15500; WO 92/20822; WO 92/20823; WO 91/15500; WO 89/12060; EP 216860; U.S. Ser. No. 92/04294; U.S. Ser. No. 90/03138; U.S. Ser. No. 91/06855; U.S. Ser. No. 92/03385; U.S. Ser. No. 91/03680; U.S. patent application Ser. Nos. 07/990,848; 07/892,902; 07/806,710; 07/763,130; 07/690,786; U.S. Pat. Nos. 5,466,677; 5,034,506; 5,124,047; 5,278,302; 5,321,131; 5,519,126; 4,469,863; 5,455,233; 5,214,134; 5,470,967; 5,434,257; Stirchak, E. P., et al., *Nucleic Acid Res.*, 1989, 17, 6129–6141; Hewitt, J. M., et al., 1992, 11, 1661–1666; Sood, A., et al., *J. Am. Chem. Soc.*, 1990, 112, 9000–9001; Vaseur, J. J. et al., *J. Amer. Chem. Soc.*, 1992, 114, 4006–4007; Musichi, B., et al., *J. Org. Chem.*, 1990, 55, 4231–4233; Reynolds, R. C., et al., *J. Org. Chem.*, 1992, 57, 2983–2985; Mertes, M. P., et al., *J. Med. Chem.*, 1969, 12, 154–157; Mungall, W. S., et al., *J. Org. Chem.*, 1977, 42, 703–706; Stirchak, E. P., et al., *J. Org. Chem.*, 1987, 52, 4202–4206; Coull, J. M., et al., *Tet. Lett.*, 1987, 28, 745; and Wang, H., et al., *Tet. Lett.*, 1991, 32, 7385–7388; incorporated herein by reference in their entirety.

Other modifications can be made to the sugar, to the base, or to the phosphate group of the nucleotide. Representative modifications are disclosed in International Publication Numbers WO 91/10671, published Jul. 25, 1991, WO 92/02258, published Feb. 20, 1992, WO 92/03568, published Mar. 5, 1992, and U.S. Pat. Nos. 5,138,045, 5,218,105, 5,223,618 5,359,044, 5,378,825, 5,386,023, 5,457,191, 5,459,255, 5,489,677, 5,506,351, 5,541,307, 5,543,507, 5,571,902, 5,578,718, 5,587,361, 5,587,469. The disclosures of each of the above referenced publications are herein incorporated by reference.

4. Lipids

The covalent attachment of lipids, as discussed above, can render an analyte more hydrophobic and increase the separation from unlabeled analytes using the halogenated polymers as described herein. Modification of analytes to incorporate a cholesteryl moiety, a prenyl group, such as farnesyl or geranylgeranyl, or fatty acylation, wherein the fatty acid typically has from 6–30 carbons, are non limiting examples of lipidic modification of analytes. More commonly, a cholesteryl moiety is covalently attached to a nucleic acid and provides a hydrophobic tag facilitating purification.

5. Hydrophobic Drugs, Peptides Vitamins, Fluorinated Moieties

Hydrophobic drugs include any of the pharmaceutical agents having a low solubility in water. Exemplary hydrophobic drugs include the taxoids, camptothecins, doxorubicins, michellamine B, vincristine, bryostatin-1, halomon and cisplatin. Incorporation of hydrophobic drugs would provide a hydrophobic tag facilitating separation of analytes.

Hydrophobic peptides include signal peptides, sequences of membrane spanning portions of proteins that are membrane bound, or channel forming peptides, such as gramicidin. Identification of hydrophobic peptides is within the abilities of one of skill in the art, generally by inspection of the amino acid sequence.

Vitamins (e.g., biotin) are commonly used as "tags" on biomolecules. In some instances, the presence of the vitamin can impart an additional hydrophobic moiety that can facilitate purification.

Perfluorinated moieties have also been used as "fluorous phase tags" for purification purposes. See, for example, U.S. Pat. No. 6,156,896 to Curran. Such perfluorinated moieties are useful separation procedures when used in conjunction with the halogenated polymers described herein.

6. Enzymes

In some instances, enzymes linked to analytes can provide additional hydrophobicity and hence increased adsorption to the halogenated polymers of the invention. Suitable enzyme labels include enzymes used in calorimetric detection and light generating enzyme molecules (e.g. luciferase).

C. Separation Procedures

Chromatographic separation methods include conventional methods that are well known in the art, such as ion pair reverse phase chromatography, high performance liquid chromatography, cartridge purification, gel chromatography, thin layer chromatography and related methods not enumerated here (e.g., supercritical fluid chromatography and other newly developed technologies). For most of these methods, preparation of beads of defined size and porosity appropriate for the particular application is desirable. Methods are known in the art for the preparation of beads of defined size and porosity, for example, as described in U.S. Pat. No. 5,585,236 to Bonn.

For many purposes, the halogenated polymers described herein can be obtained from commercial suppliers and halogenated according to the procedures described above and in Examples 1 and 2. If it is desired to utilize commercial products, often the desired particle size and porosity is available without further modification.

The chromatography sorbents of the invention can also be used in microfluidics applications incorporating a chromatographic component. For microfluidics chromatographic separation methods, such as capillary chromatography or capillary electrophoresis, the halogenated polymer can be prepared in the form of a surface coating for substantially planar surfaces or for curved channels, as a monolith, or in the form of beads adapted to fill microchannels of specific size and depth.

More typically, the halogenated polymers described herein are used in high performance liquid chromatography (HPLC) and cartridge purification systems. For the former, the halogenated polymer is preferably present in the form of beads having a small diameter (e.g., 1–80 microns, and preferably smaller for maximal resolution), while for the latter, larger beads (e.g., 80–200 microns) provide more satisfactory performance.

The methods of the present invention are particularly advantageous when used to separate mixtures of nucleic acids or full length oligonucleotides from failure sequences. Nucleic acid mixtures to be separated can have any number of bases, although for oligonucleotide applications, generally there will be 1000 bases or fewer. The methods described herein provide excellent separation for longer oligonucleotides labeled with trityl groups from detritylated or failure sequences.

The nucleic acids which may be separated by the present method can include both single strand and double strand nucleic acids of DNA and RNA. Samples containing mixtures of nucleic acids may result from total synthesis of nucleotide sequences, cleavage of DNA or RNA by shearing or with restriction endonucleases, as well as nucleic acid samples which have been multiplied and amplified using polymerase chain reaction techniques.

1. HPLC

The chromatography sorbent described herein can be used as the stationary phase in conventional, reversed phase or ion pair reversed phase HPLC, and similar techniques. Procedures for packing HPLC columns are commonly known throughout the art, for example as described in U.S. Pat. No. 5,585,236 to Bonn.

Examples 3 and 4 illustrate the use of the halogenated polymers of the invention in an HPLC method. For maximal resolution under HPLC conditions, particles of a smaller size are preferable, in the range of 1–80 microns, and preferably less than 10 microns in diameter.

2. Cartridge Purification Procedures a. Oligonucleotide Purification Cartridge

In a preferred embodiment, an oligonucleotide purification cartridge is provided, which is useful for tritylated oligonucleotides and oligonucleotides labeled with other protecting groups or fluorophores, for example. Incorporation of the chromatography sorbent in an oligonucleotide purification cartridge provides a one step purification method with high binding capacity for trityl-on oligonucleotides.

This procedure is particularly useful when the 5' dimethyloxytrityl or monomethoxytrityl protecting group is left on the oligonucleotide. The trityl group (or fluorophore, or cholesterylated nucleic acid, for example) is highly hydrophobic, and adsorbs to the hydrophobic chromatography sorbent as described herein when passed through the cartridge. When used in a cartridge purification system, the chromatography sorbents of the invention have a remarkable capacity for the retention of nucleic acids, and are particularly useful for oligonucleotides longer than 40–50 nucleotides in length, which represents a superior and unexpected advance over the methods known in the art. The strong retention by the chromatography sorbent allows the analyst to obtain clean full-length oligonucleotides using a very thorough solvent wash, optionally containing a higher content of organic solvents such as acetonitrile, in order to remove failure sequences and other impurities.

A suggested procedure for using the chromatography sorbents in an oligonucleotide purification cartridge is described as follows:

1. Pass 5 mL of acetonitrile through the cartridge to waste.
2. Pass 5 mL of 2M Triethylamine Acetate (TEAA) through the OPC to waste.
3. Dilute the oligonucleotide solution with an equal volume of water, e.g., 1 mL of each. Pass the diluted solution through the cartridge at a rate of about 1 drop per second. Collect the eluate and pass it through a second time.
4. Pass 5 mL of dilute ammonia through the cartridge to waste.
5. Pass 10 mL of water through the cartridge to waste.
6. Fill the syringe barrel with 5 mL 2% trifluoroacetic acid (TFA) in water and pass a portion through the cartridge to waste. Let stand 3–5 minutes before passing the remainder through to waste.
7. Pass 10 mL of water through the cartridge to waste.
8. Pass 5 mL of dilute ammonia through the cartridge to waste.
9. Pass 5 mL of water through the cartridge to waste.
10. Elute drop-by-drop with 1 mL of 20% acetonitrile in water and collect the purified oligonucleotide.

b. Desalting

A purification cartridge as described herein can also be used for desalting of biological materials. In particular, desalting of synthetic oligonucleotides can be performed using the chromatography sorbents of the invention.

Desalting using the chromatography sorbents of the invention is a hydrophobicity-based separation. When used in a desalting procedure, the chromatography sorbents of the invention have a remarkable capacity for the retention of nucleic acids, and are not limited to oligonucleotides of less than 40 or 50 nucleotides, which represents a superior and unexpected advance over the methods known in the art.

1. A suggested procedure for using the chromatography sorbents in an oligonucleotide desalting procedure (for de-tritylated oligonucleotides) is described as follows:

Wash the cartridge with 5 mL of acetonitrile, and then with 5 mL of 2 M TEAA.

Dissolve the oligonucleotide in 1 mL of 0.1 M TEAA, then load it onto the cartridge passing it through the cartridge twice at 1–2 drops per second.

Wash the cartridge with 5 mL of 0.1 M TEAA, followed by 10 mL of deionized water. Then elute the desalted oligonucleotide with 1 mL of 50% acetonitrile.

2. For combined desalting and detritylation of nucleotides synthesized trityl-on, a suggested procedure is described below:

Wash the OPC with 5 mL of acetonitrile followed by 5 mL of 2 M TEAA.

Carefully load the oligonucleotide sample dissolved in 1 mL of 0.1 M TEAA onto the cartridge, recycling it through the cartridge twice at 1–2 drops per second.

Wash the cartridge with 5 ML of 0.1 M TEAA followed by 5 mL of 10% aqueous acetonitrile in 0.1 M TEAA and 10 mL of sterile, deionized water.

Pass 5 mL of 2% trifluoroacetic acid (TFA) through the cartridge, as follows: push approximately 1 mL through the cartridge, pause for 5 minutes, then flush the remaining TFA solution through the cartridge.

Wash the cartridge with 10 ML of sterile, deionized water, then elute the desalted and detritylated oligonucleotide with 1 mL of 30% aqueous acetonitrile.

IV. EXAMPLES

It is to be understood that while the invention has been described in conjunction with the preferred specific embodiments thereof, the foregoing description, as well as the examples that follow, are intended to illustrate and not limit the scope of the invention. Other aspects, advantages and modifications will be apparent to those skilled in the art to which the invention pertains.

All patents, patent applications, journal articles and other references cited herein are incorporated by reference in their entireties.

The following examples are put forth so as to provide those of ordinary skill in the art with a complete disclosure and description of how to make and use the compounds of the invention, and are not intended to limit the scope of what the inventors regard as their invention. Efforts have been made to ensure accuracy with respect to numbers (e.g., amounts, temperatures, etc.) but some errors and deviations should be accounted for. Unless indicated otherwise, parts are parts by weight, temperature is in degrees Celsius (° C.), and pressure is at or near atmospheric.

In the procedures set forth below and throughout this specification, the abbreviations employed have their generally accepted meanings, as follows:
° C. Celsius (or Centigrade)
mM millimolar
μM micromolar
mg milligram
μg microgram
mL milliliter
μL microliter
μm micrometer
TEAA Triethylammonium acetate
PSDVB poly(styrene divinylbenzene)

Materials: The following materials were obtained from the indicated source: Nitrobenzene, Acetone, Methanol, HCl were from Fisher, Fairlawn, N.J. PSDVB particles were obtained from Tosoh Haas, and were filtered and washed with acetone and dried it at 70–80 ° C. for 24 hrs before use. Bromine and THF were from Aldrich, Milwaukee, Wis. Oligonucleotides were supplied by Trilink Biotechnologies, Inc., San Diego, Calif. Heptadecafluorooctane was obtained from Oakwood Chemical, West Columbia, S.C. Aluminum chloride was obtained from Alfa Aesar, Ward Hill, Mass.

Methods HPLC was performed using a Varian Prostar HPLC system.

Example 1

Synthesis of Poly(styrene Divinylbenzene) Heptadecafluorooctane

Figure 3:
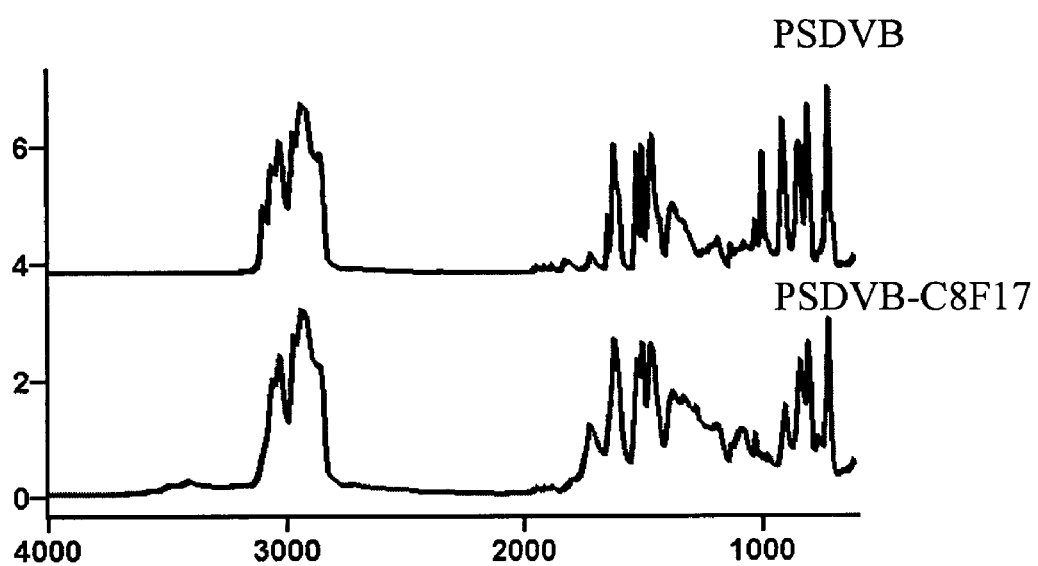
FIG. 3 shows the FTIR spectra obtained before and after fluorocarbylation of PSDVB beads.

This reaction is shown schematically in FIG. 1. Nitrobenzene (125 mL) was placed in a reactor and purged with nitrogen for an hour with stirring at room temperature. Aluminum chloride (3.2 gm) was added and purging was continued for another hour, followed by the addition of 1-bromoheptadecafluorooctane (12.0 gm). Finally PSDVB particles (5.0 gm) were added and the mixture was stirred for 20 hours at 100–100° C. under nitrogen. At the end of the reaction period, the mixture was cooled to room temperature and mixed with methanol containing 10% (v/v) concentrated HCl while stirring for about 2 minutes. The resulting particles of heptadecafluorooctane PSDVB were recovered by filtering through a sintered glass funnel under vacuum and extensively washed using the following sequence of solvents: THF, methanol, methanol containing 20% (v/v) concentrated HCl, THF, methanol and acetone. The washed polymer was dried under vacuum for 24 hours at 70–80° C. The fluorocarbylated PSDVB was characterized using FTIR using nonfluorocarbylated PSDVB as a reference. The FTIR spectra are shown in FIG. 3, indicating the incorporation of fluorine. Elemental analysis indicated that the incorporation of fluorine was approximately 0.05 to 0.06%.

Example 2

Synthesis of Brominated PSDVB-$C_{18}$

Bromination of polystyrene was performed essentially as described by Tallarico, J. A., et al., (2001) *J. Comb. Chem.* 3, 312–318, and utilized a thallium-acetate catalyst to effect electrophilic aromatic bromination. This reaction is shown schematically in FIG. 2. The bromination procedure was as follows: C-18 Alkylated PSDVB particles (POLYSorb™ ACT-1, C-18, 10.0 gm, Transgenomic, Inc., San Jose, Calif., #SPE-99-0101) were suspended in 250 mL methylene chloride and stirred for 1 hour under nitrogen. Thallium (III) acetate was added (0.7 gm) to the reaction mixture and stirring was continued for an additional hour under nitrogen. Bromine (4.5 mL) was added to the reaction and stirred for 5 hours under nitrogen at room temperature. The reaction was quenched by the addition of 10 mL methanol. The brominated PSDVB-$C_{18}$ particles were recovered by filtering through a sintered glass funnel under vacuum and washed with distilled water, methanol and acetone and dried under vacuum for 24 hours at 70–80° C. Bromination was verified by elemental analysis, and the sample was determined to contain 9.28% bromine by weight. Elemental analysis was also performed on unmodified PSDVB-$C_{18}$ particles. The bromine content was determined to be less than 0.06% by weight, consistent with expectations.

A second batch of C-18 alkylated PSDVB particles was brominated using an identical procedure, allowing bromination to proceed for only 2 hours. The bromine in this sample likewise was verified by elemental analysis and the brominated particles were determined to contain 9.86% bromine by weight.

Example 3

Figure 4A:
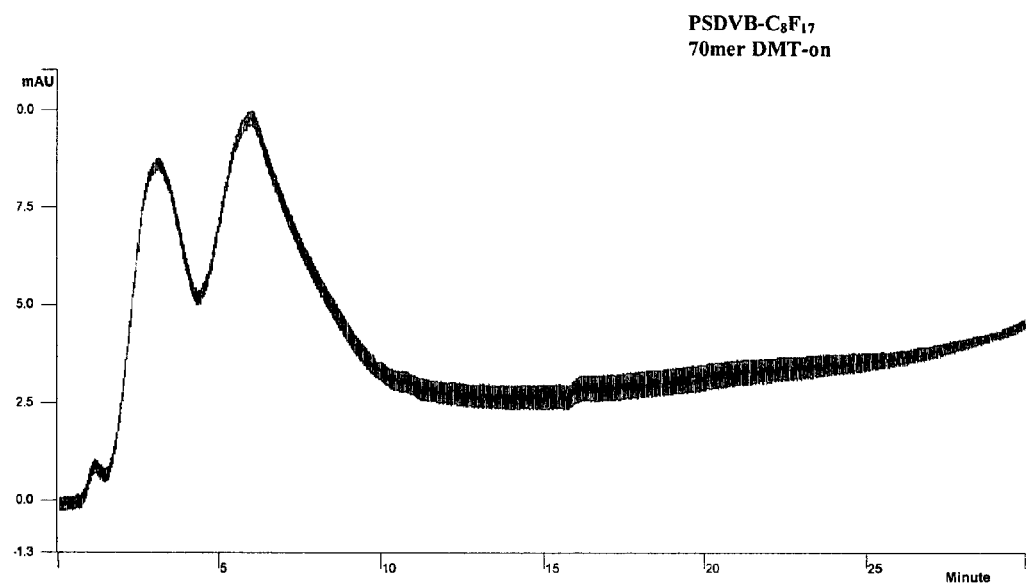
FIGS. 4A and B are HPLC chromatograms comparing the retention times of a tritylated and detritylated 70 mer on PSDVB-$C_8F_{17}$.
Figure 4B:
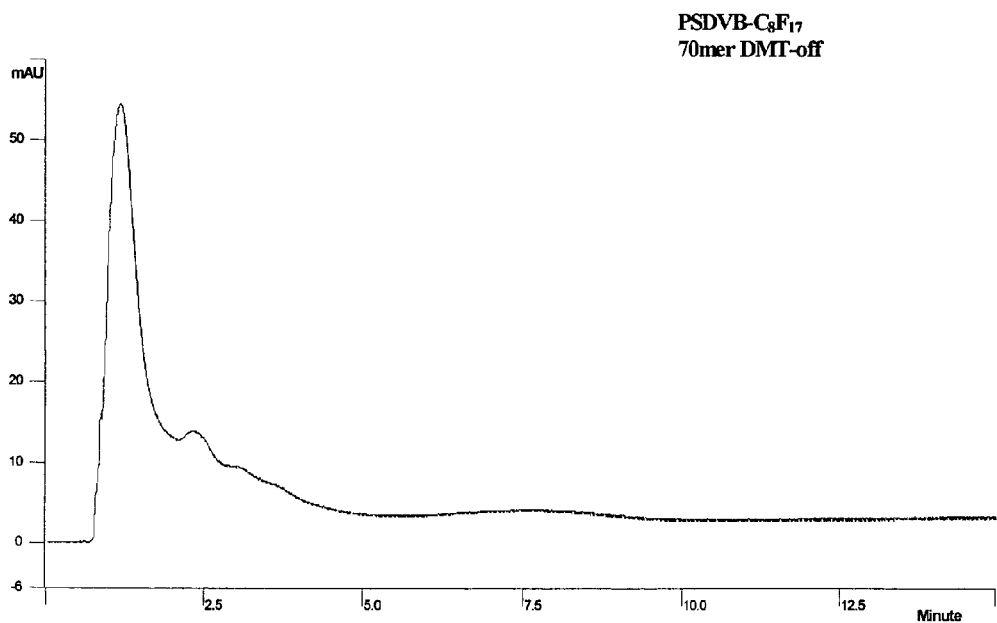
Figure 5A:
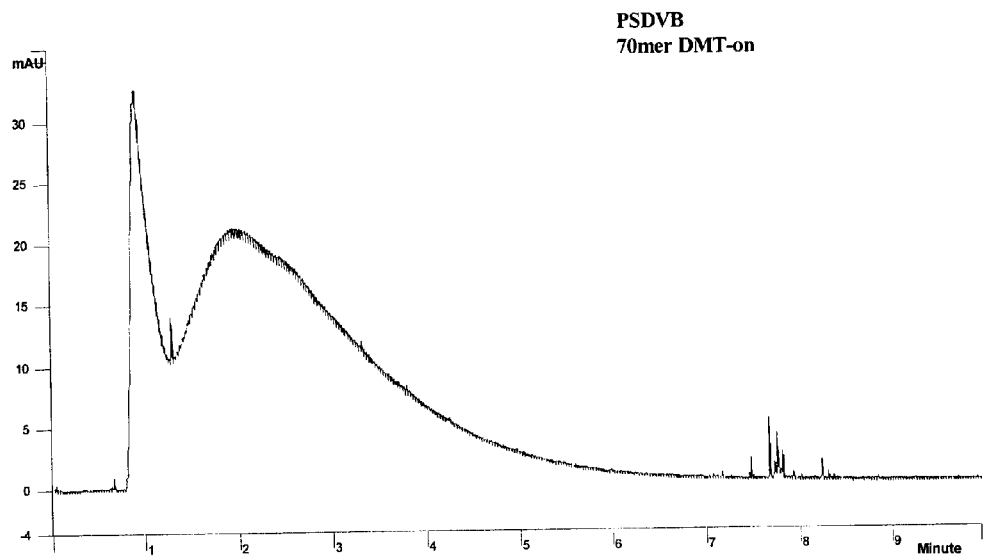
FIGS. 5A and B are HPLC chromatograms comparing the retention times of a tritylated and detritylated 70 mer on unmodified PSDVB.
Figure 5B:
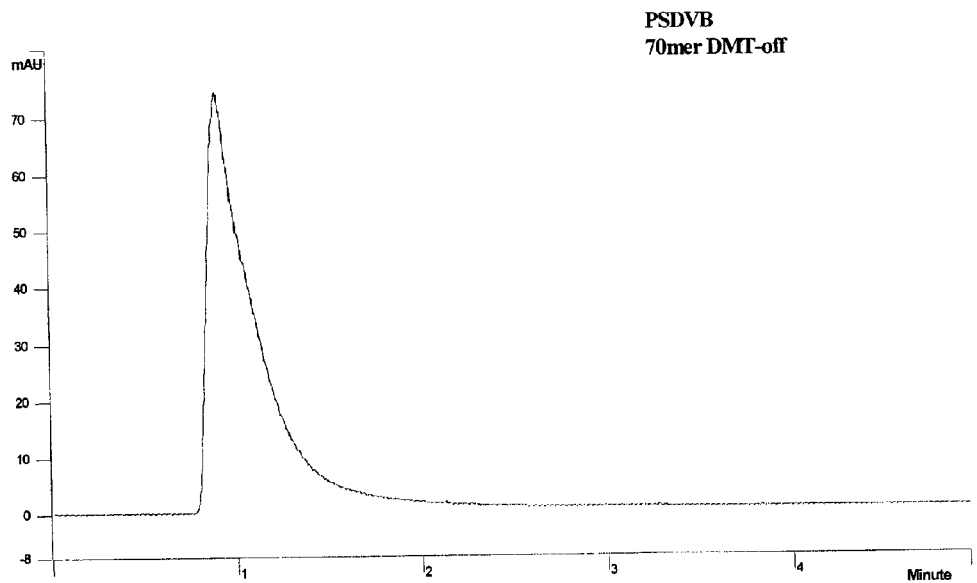
Figure 6:
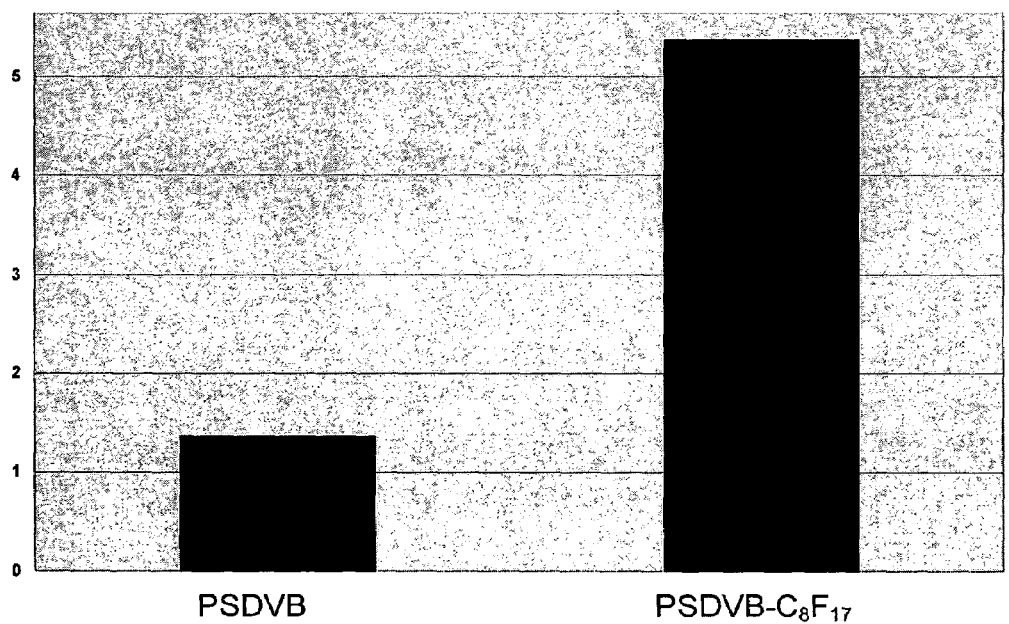
FIG. 6 presents a comparison of retention times for a tritylated 70 mer on PSDVB-$C_8F_{17}$ and PSDVB.

Separation of DMT-labeled Oligonucleotides From Unlabeled Oligonucleotides Using PSDVB-$C_8F_{17}$ A column was packed with PSDVB-$C_8F_{17}$ particles, prepared as described in Example 1, to dimensions of 100 mm×46 mm. The particles were 80–160 μm in diameter, and had a pore size of 150 Å and surface area of 900 m$^2$/gm. The PSDVB-$C_8F_{17}$ column was equilibrated with a mobile phase containing 80% 0.1M TEAA and 20% $CH_3CN$ at a flow rate of 2.5 mL per minute. Oligonucleotides (the 70 mer, SEQ ID NO:1) 10 μL of each 70mer DMT-on and 70mer DMT-off solutions were loaded onto the column and were eluted from the column using a gradient of 20%–80% $CH_3CN$/0.1M TEAA over a period of 30 minutes. The retention times for the DMT-labeled and DMT-unlabeled oligonucleotide by PSDVB-$C_8F_{17}$ particles were determined, and the chromatograms for the DMT-labeled oligonucleotide and DMT-unlabeled oligonucleotide on PSDVB-$C_8F_{17}$ particles are shown in FIGS. 4A and 4B. An identical zexperiment was performed using PSDVB particles in the absence of functionalization for comparison. The results are shown in FIG. 5A and 5B. In FIG. 6, it can be seen that the retention time for the DMT-labeled oligonucleotide is greatly increased when using the PSDVB-$C_8F_{17}$ particles in comparison to the retention times for the DMT-labeled oligonucleotide using unmodified PSDVB particles. This data indicates that retention of DMT-labeled oligonucleotides on PSDVB-$C_8F_{17}$ particles is about 5 times greater than retention on PSDVB particles in the absence of functionalization.

Figure 7:
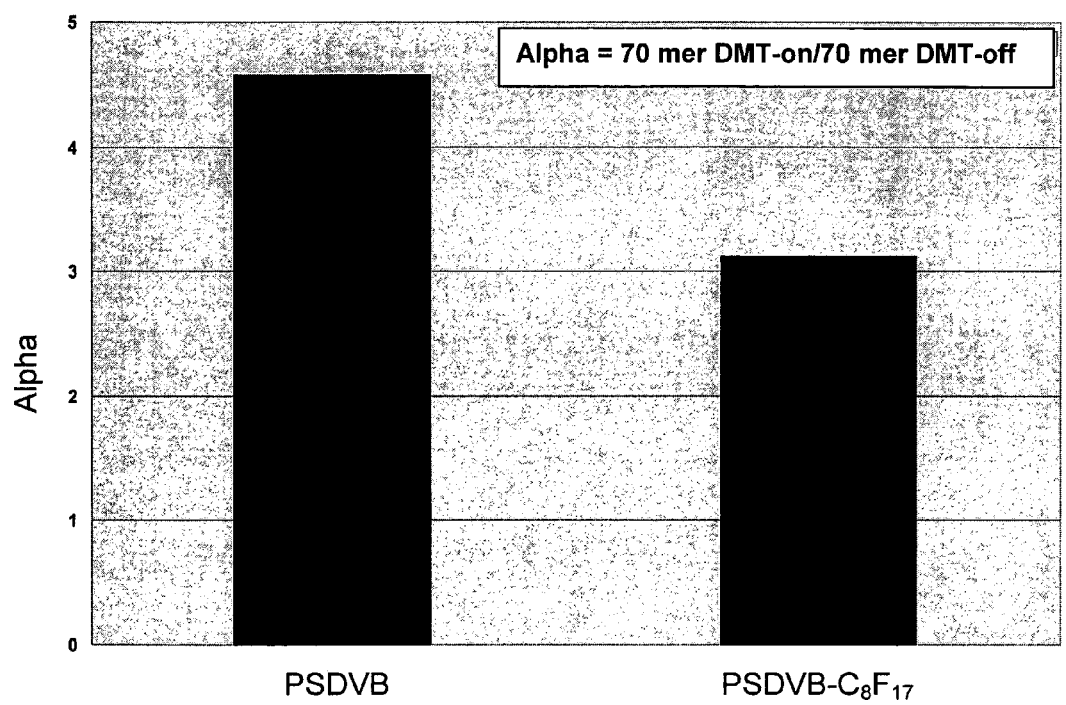
FIG. 7 presents a comparison of the selectivity ratios determined from the HPLC retention times for the tritylated and detritylated 70 mer on PSDVB-$C_8F_{17}$ and PSDVB.

Selectivity was expressed as a ratio, alpha, of the retention times for DMT-labeled oligonucleotide and DMT-unlabeled oligonucleotides. The results are shown in FIG. 7, where it can be seen that PSDVB-$C_8F_{17}$ particles have a selectivity ratio for DMT labeled oligonucleotides of about 3. Taken together, the selectivity and greatly increased retention times on PSDVB-$C_8F_{17}$ particles results in the ability to obtain a highly purified full length oligonucleotide from which failure sequences and other impurities have been removed.

Example 4

Figure 8A:
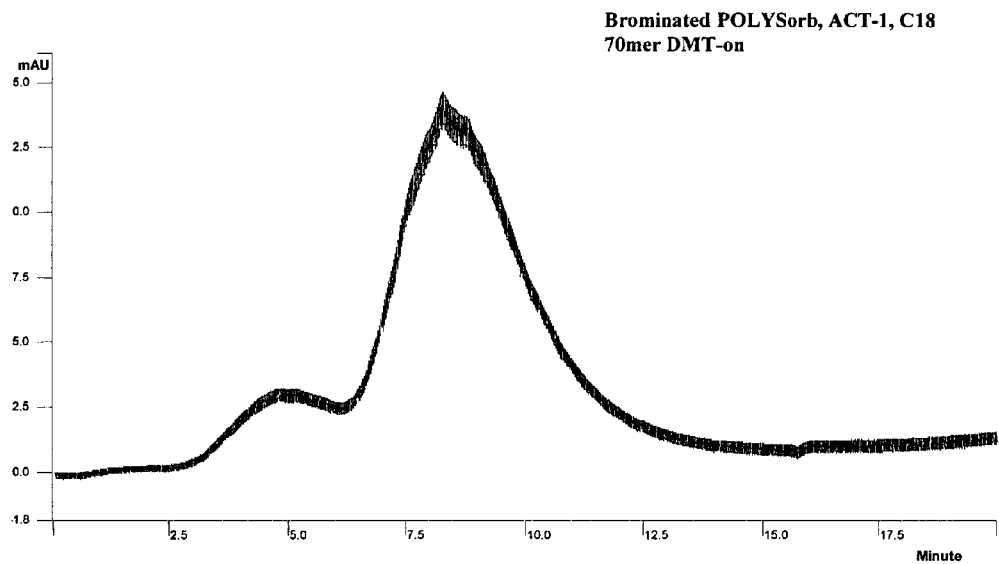
FIGS. 8A and B are HPLC chromatograms comparing the retention times of a tritylated and detritylated 70 mer on brominated C-18 PSDVB.
Figure 8B:
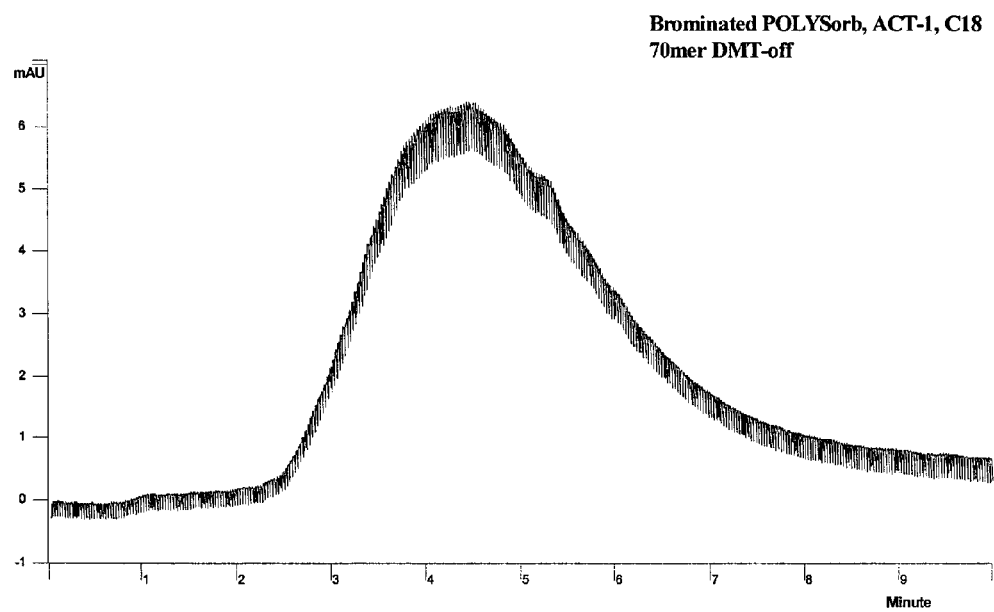
Figure 9A:
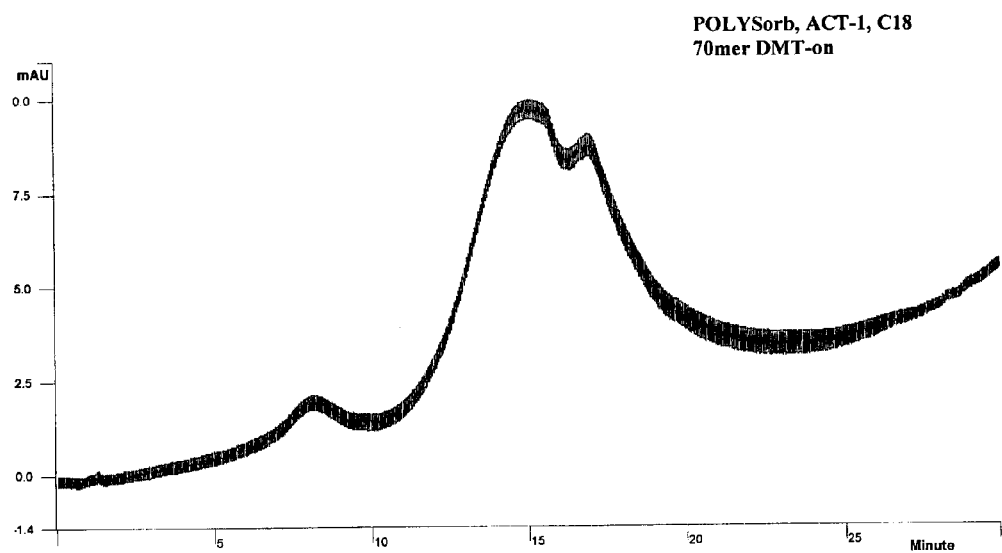
FIGS. 9A and B are HPLC chromatograms comparing the retention times of a tritylated and detritylated 70 mer on brominated and unmodified C-18 PSDVB.
Figure 9B:
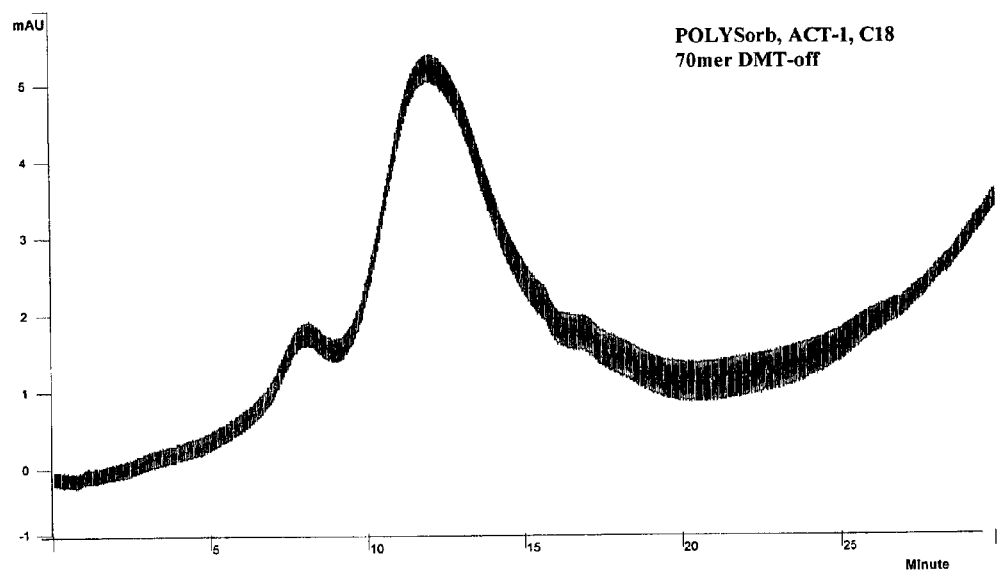

Separation of DMT-labeled Oligonucleotides From Unlabeled Oligonucleotides Using Brominated PSDVB-$C_{18}$ A column was packed with brominated PSDVB-$C_{18}$ particles, prepared as described in Example 2. The column dimensions were 100 mm×46 mm. The brominated PSDVB-$C_{18}$ column was equilibrated with a mobile phase containing 80% 0.1M TEAA and 20% $CH_3CN$ at a flow rate of 2.5 mL per minute. Oligonucleotides (the 70 mer, SEQ ID NO:1)10 μL of each 70mer DMT-on and 70mer DMT-off solutions were loaded onto the column and were eluted from the column using a gradient of 20%–80% $CH_3CN$ over a period of 30 minutes. The retention times for the DMT-labeled and DMT-unlabeled oligonucleotide using brominated PSDVB-$C_{18}$ particles were determined, and the chromatograms for the DMT-labeled oligonucleotide and DMT-unlabeled oligonucleotide on brominated PSDVB-$C_{18}$ particles are shown in FIGS. 8A and 8B. An identical experiment was performed using PSDVB-$C_{18}$ particles in the absence of functionalization for comparison. The results are shown in FIGS. 9A and 9B.

Figure 10:
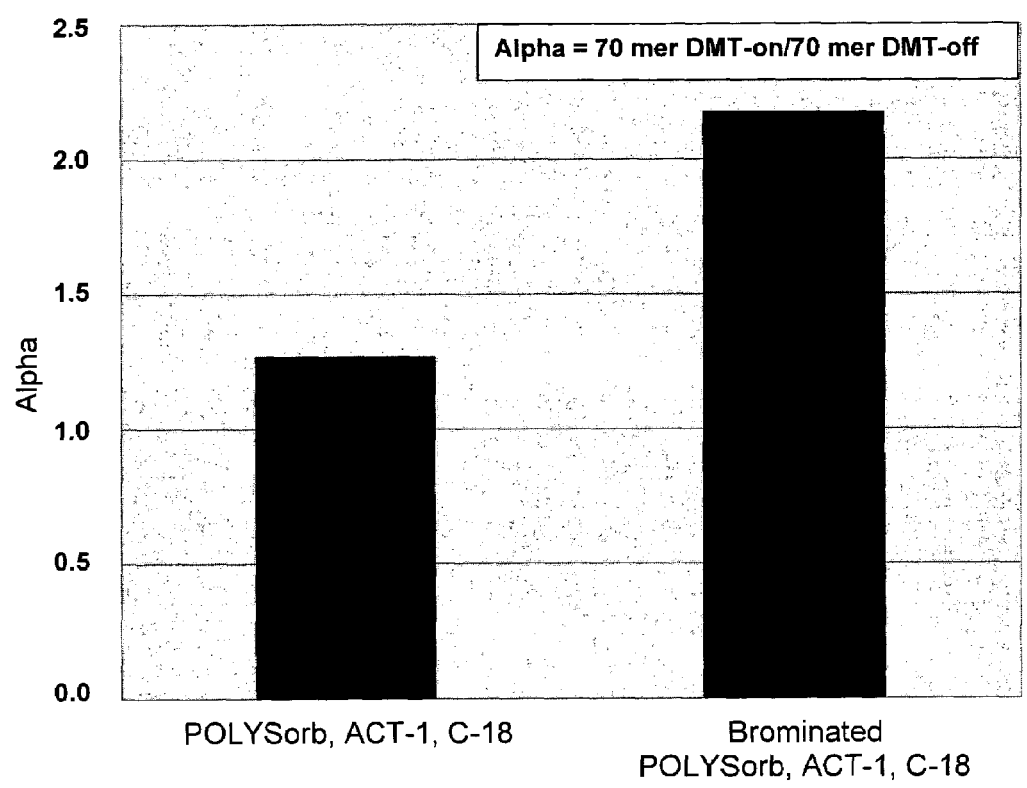
FIG. 10 presents a comparison of the selectivity ratios determined from the HPLC retention times for the tritylated and detritylated 70 mer on brominated and unmodified C-18 PSDVB.

The selectivity ratio shown in FIG. 10 for DMT-labeled oligonucleotides over DMT-unlabeled oligonucleotides on brominated PSDVB-$C_{18}$ particles is higher than that for PSDVB which has not been functionalized. The use of brominated PSDVB-$C_{18}$ particles for DMT-labeled oligonucleotides results in a highly purified full length oligonucleotide from which failure sequences and other impurities have been removed Although the invention has been described with respect to particular embodiments, it will be apparent to those skilled in the art that various changes and modifications can be made without departing from the invention.

What is claimed is:

1. A method of separating a mixture of analytes, comprising
   (1) applying the mixture of analytes to a chromatography sorbent comprising polymer beads of aromatic vinyl monomers substituted with hydrocarbyl or halocarbyl substituents, or combinations thereof, comprising from 1 to 1,000,000 carbon atoms, wherein said aromatic vinyl monomers or said hydrocarbyl substituents or both have been functionalized by halogenation, provided that when the vinyl aromatic monomers are brominated, bromination is performed utilizing electrophilic aromatic substitution; and (2) removing polar analytes from the chromatography sorbent by a hycirophilic solvent wash.

2. The method of claim 1, wherein the halocarbyl substituent is a fluorocarbyl substituent comprising from 1 to 100 carbons.

3. The method of claim 1, wherein said aromatic vinyl monomers are functionalized by bromination.

4. The method of claim 1, further comprising:
(3) eluting nonpolar analytes front the chromatography sorbent with a hydrophobic solvent wash.

5. The method of claim 1, further comprising:
(4) performing a cleavage step on the chromatography sorbent; and
(5) eluting additional analytes from the chromatography sorbent.

6. The method of claim 5, wherein the cleavage step is performed by treating the chromatography sorbent with acid, base, enzymes, chemical cleavage agents, or light.

7. The method of claim 1, wherein at least one of the analytes comprises a hydrophobic moiety selected from a protecting group, a fluorescent label, a dye, a quenching agent, a lipid, a hapten, a fluorinated moiety, a vitamin, a hydrophobic peptide, a hydrophobic drug, or mixtures thereof.

8. The method of claim 7, wherein the hydrophobic moiety is cleavable from the analyte.

9. The method of claim 1, wherein halogen substituents are present on the aromatic vinyl monomers, but not present on the linkers between the aromatic monomers.

10. The method of claim 2, wherein the fluorocarbyl substituent comprises from 1 to 20 carbon atoms.

11. The method of claim 2, wherein the fluorocarbyl substituent is perfluorocarbyl.

12. The method of claim 11, wherein the perfluorocarbyl substituent is selected from heptadecafluorooctyl or pentafluorobenzyl.

13. The method of claim 3, wherein the brominated vinyl aromatic monomers are further substituted with bydrocarbyl substituents comprising from 1 to 100 carbon atoms.

14. The method of claim 13, wherein the hydrocarbyl substituents comprise from 1 to 20 carbon atoms.

15. The method of claim 13, wherein the aromatic monomers are brominated after substitution with hydrocarbyl substituents.

16. The method of claim 1, wherein the mixture of analytes comprises nucleic acids, peptides, carbohydrates, lipids, synthetic compounds, compounds from a combinatorial library, or combinations thereof.

17. The method of claim 16, wherein the mixture of analytes comprises nucleic acids having a modified phosphate backbone, tritylated oligonucleotides, oligonucleotides labeled with dyes, biotinylated oligonucleotides, or cholesterylated oligonucleotides, or combinations thereof.

18. The method of claim 7, wherein the protecting group is a hydroxyl protecting group stable to oligonucleotide synthesis conditions.

19. The method of claim 7, wherein the protecting group is selected from an ether, substituted methyl ether, substituted ethyl ether, silyl ether, ester, carbonate, trityl, pixyl, or moxyl.

20. The method of claim 1, wherein the chromatography sorbent is utilized in a chromatographic separation method selected from ion pair reverse phase chromatography, high performance liquid chromatography, cartridge purification, gel chromatography, thin layer chromatography or microfluidics applications incorporating a chromatographic component.

21. A chromatographic method for separating labeled nucleic acids from unlabeled nucleic acids comprising:
(1) contacting a solution comprising labeled and unlabeled nucleic acids with a chromatography sorbent comprising a halogenated polymer of aromatic vinyl monomers comprising styrene and divinylbenzene substituted with hydrocarbyl or halocarbyl substituents, or combinations thereof, comprising from 1 to 1,000,000 carbon atoms, wherein said vinyl aromatic monomers or said hydrocarbyl substituents or both have been functionalized by halogenation, provided that when the vinyl aromatic monomers are brominated, bromination is performed utilizing electrophilic aromatic substitution; and
(2) eluting unlabeled nucleic acids from the chromatography sorbent with a solvent wash.

22. The chromatographic separation method of claim 21, wherein said vinyl aromatic monomers are brominated.

23. The chromatographic separation method of claim 21, wherein said halocarbyl substituent is fluorocarbyl.

24. The chromatographic separation method of claim 21, further comprising:
(3) eluting labeled nucleic acids from the chromatography sorbent with a hydrophobic solvent wash.

25. The chromatographic separation method of claim 21, further comprising:
(3) treating the chromatography sorbent with a cleavage agent; and
(4) eluting additional nucleic acids from the chromatography sorbent.

26. The chromatographic separation method of claim 25, wherein the cleavage agent is selected from the group consisting of acid, base, enzymes, chemical cleavage agents and light.

27. The chromatographic separation method of claim 21, wherein the labeled nucleic acids comprise a hydrophobic moiety selected from a protecting group, a fluorescent label, a dye, a quenching agent, a lipid, a hapten, a fluorinated moiety, a vitamin, a hydrophobic peptide, a hydrophobic drug, or mixtures thereof.

28. The chromatographic separation method of claim 27, wherein the protecting group is stable to oligonucleotide synthesis conditions and unstable in the presence of acid.

29. A method of separating a mixture of analytes, comprising
(1) applying the mixture of analytes to a chromatography sorbent comprising a brominated polymer comprising aromatic monomers substituted with hydrocarbyl or halocarbyl substituents, or combinations thereof, comprising from 1 to 1,000,000 carbon atoms; wherein the bromine substitutions are present on the aromatic monomers of the polymer, and
(2) removing polar analytes from the chromatography sorbent by a hydrophilic solvent wash.

30. The method of claim 29, wherein the brominated polymer is brominated poly(styrene divinylbenzene).

31. The method of claim 29, wherein the hydrocarbyl or halocarbyl substituent comprises from 1 to 100 carbon atoms.

32. The method of claim 29, wherein the halocarbyl substituent is fluorocarbyl.

33. The method of claim 32, wherein the fluorocarbyl substituent is perfluorocarbyl.

34. The method of claim 29, further comprising:
(3) eluting nonpolar analytes from the chromatography sorbent with a hydrophobic solvent wash.

35. The method of claim 29, further comprising:
(4) performing a cleavage step on the chromatography sorbent; and
(5) eluting additional analytes from the chromatography sorbent.

36. The method of claim 35, wherein the cleavage step is performed by treating the chromatography sorbent with acid, base, enzymes, chemical cleavage agents, or light.

37. The method of claim 29, wherein at least one of the analytes comprises a hydrophobic moiety selected from a protecting group, a fluorescent label, a dye, a quenching agent, a lipid, a hapten, a fluorinated moiety, a vitamin, a hydrophobic peptide, a hydrophobic drug, or mixtures thereof.

38. The method of claim 29, wherein the mixture of analytes comprises nucleic acids, peptides, carbohydrates, lipids, synthetic compounds, compounds from a combinatorial library, or combinations thereof.

39. The method of claim 38, wherein the mixture of analytes comprises nucleic acids having a modified phosphate backbone, tritylated oligonucleotides, oligonucleotides labeled with dyes, biotinylated oligonucleotides, or cholesterylated oligonucleotides, or combinations thereof.

40. The method of claim 37, wherein the protecting group is a hydroxyl protecting group stable to oligonucleotide synthesis conditions.

41. The method of claim 37, wherein the protecting group is selected from an ether, substituted methyl ether, substituted ethyl ether, silyl ether, ester, carbonate, trityl, pixyl, or moxyl.

42. A method of separating a mixture of analytes, comprising
(1) applying the mixture of analytes to a chromatography sorbent comprising a polymer comprising aromatic vinyl monomers substituted with halocarbyl substituents comprising from 1 to 1,000,000 carbon atoms; and
(2) removing polar analytes from the chromatography sorbent by a hydrophiilic solvent wash.

43. The method of claim 42, wherein the halocarbyl substituent comprises from 1 to 100 carbon atoms.

44. The method of claim 42, wherein the halocarbyl substituent is fluorocarbyl.

45. The method of claim 44, wherein the fluorocarbyl substituent is perfluorocarbyl.

46. The method of claim 45, wherein the perfluorocarbyl substituent is selected from heptadecafluorooctyl or pentafluorobenzyl.

47. The method of claim 42, further comprising:
(3) eluling nonpolar analytes from the chromatography sorbent with a hydrophobic solvent wash.

48. The method of claim 42, further comprising:
(4) performing a cleavage step on the chromatography sorbent; and
(5) eluting additional analytes from the chromatography sorbent.

49. The method of claim 48, wherein the cleavage step is performed by treating the chromatography sorbent with acid, base, enzymes, chemical cleavage agents, or light.

50. The method of claim 42, wherein at least one of the analytes comprises a hydrophobic moiety selected from a protecting group, a fluorescent label, a dye, a quenching agent, a lipid, a hapten, a fluorinated moiety, a vitamin, a hydrophobic peptide, a hydrophobic drug, or mixtures thereof.

51. The method of claim 42, wherein the mixture of analytes comprises nucleic acids, peptides, carbohydrates, lipids, synthetic compounds, compounds from a combinatorial library, or combinations thereof.

52. The method of claim 51, wherein the mixture of analytes comprises nucleic acids having a modified phosphate backbone, tritylated oligonucleotides, oligonucleotides labeled with dyes, biotinylated oligonucleotides, or cholesterylated oligonucleotides, or combinations thereof.

53. The method of claim 50, wherein the protecting group is a hydroxyl protecting group stable to oligonucleotide synthesis conditions.

54. The method of claim 50, wherein the protecting group is selected from an ether, substituted methyl ether, substituted ethyl ether, silyl ether, ester, carbonate, trityl, pixyl, or moxyl.

* * * * *

SEQUENCE LISTING

```
<160> NUMBER OF SEQ ID NOS: 1

<210> SEQ ID NO 1
<211> LENGTH: 70
<212> TYPE: DNA
<213> ORGANISM: artificial sequence
<220> FEATURE:
<223> OTHER INFORMATION: oligonucleotide

<400> SEQUENCE: 1
gactgaatgg ctgatctagc tatgctaatc gcgatcctag tcacggtcca tctggcttaa        60
cgtcgaaact                                                              70
```